(12) United States Patent
Shudarek et al.

(10) Patent No.: US 9,356,503 B2
(45) Date of Patent: May 31, 2016

(54) COMBINED ACTIVE AND PASSIVE HARMONIC MITIGATION DEVICES AND APPLICATIONS THEREOF

(75) Inventors: Todd Shudarek, West Bend, WI (US); Jean-Yves Schneider, Milwaukee, WI (US)

(73) Assignee: MTE Corporation, Menomonee Falls, WI (US)

( * ) Notice: Subject to any disclaimer, the term of this patent is extended or adjusted under 35 U.S.C. 154(b) by 811 days.

(21) Appl. No.: 13/458,760

(22) Filed: Apr. 27, 2012

(65) Prior Publication Data
US 2013/0038139 A1    Feb. 14, 2013

Related U.S. Application Data

(60) Provisional application No. 61/479,738, filed on Apr. 27, 2011.

(51) Int. Cl.
| | |
|---|---|
| *H02J 1/02* | (2006.01) |
| *H02M 1/12* | (2006.01) |
| *H02M 1/14* | (2006.01) |
| *H02J 3/18* | (2006.01) |
| *H02J 3/24* | (2006.01) |
| *H01F 27/255* | (2006.01) |
| *H01F 27/34* | (2006.01) |
| *H02J 3/01* | (2006.01) |

(52) U.S. Cl.
CPC ............. *H02M 1/126* (2013.01); *H01F 27/255* (2013.01); *H01F 27/34* (2013.01); *H02J 3/1828* (2013.01); *H02J 3/24* (2013.01); *H02J 3/01* (2013.01); *Y02E 40/30* (2013.01); *Y02E 40/40* (2013.01)

(58) Field of Classification Search
CPC ............. H02J 3/01; H02J 3/24; H02J 3/1842; H02J 3/18; Y02E 40/40; H02M 1/12; H02M 1/126; H03H 7/09; H03H 7/0138; H03H 7/0153

USPC .......................................................... 307/105
See application file for complete search history.

(56) References Cited

U.S. PATENT DOCUMENTS

| | | | |
|---|---|---|---|
| 4,812,669 A | | 3/1989 | Takeda et al. |
| 5,548,165 A | * | 8/1996 | Mohan et al. ................... 307/36 |
| 5,757,099 A | | 5/1998 | Cheng et al. |
| 6,191,676 B1 | | 2/2001 | Gabor |
| 6,605,882 B2 | | 8/2003 | Boudrias et al. |
| 7,142,081 B1 | | 11/2006 | Shudarek |
| 2004/0246088 A1 | | 12/2004 | Shoji et al. |
| 2008/0272758 A1 | | 11/2008 | Melanson |
| 2011/0057517 A1 | | 3/2011 | Zhang |
| 2012/0256719 A1 | * | 10/2012 | Shudarek et al. ............. 336/179 |

OTHER PUBLICATIONS

International Search Report from International Appln. No. PCT/US12/35603 dated Jul. 30, 2012 (2 pgs).

* cited by examiner

*Primary Examiner* — Carlos Amaya
(74) *Attorney, Agent, or Firm* — Greenberg Traurig, LLP

(57) ABSTRACT

In one embodiment, the instant invention can provide a harmonic mitigating device that can include at least the following components: an active filter; a passive filter; c) at least one control switch, where the at least one control switch operationally controls whether the at least one active filter or the at least one passive filter can be utilized by the harmonic mitigation device to mitigate at least one harmonic current flow, and where the at least one control switch operationally switches the harmonic mitigation device from utilizing the at least one active filter to utilizing the at least one passive filter when a current load exceeds a predetermined percent of a full current load.

16 Claims, 31 Drawing Sheets

| Property | Unit | Symbol | Value |
|---|---|---|---|
| Initial Permeability @ B < 10 gauss | | $\mu_i$ | 2000 |
| Flux Density @ Field Strength | gauss oersted | B H | 4900 5 |
| Residual Flux Density | gauss | $B_r$ | 1800 |
| Coercive Force | oersted | $H_c$ | 0.30 |
| Loss Factor @ Frequency | $10^{-6}$ MHz | $\tan\delta/\mu_i$ | 15 0.1 |
| Temperature Coefficient of Initial Permeability (20 -70°C) | %/°C | | 0.7 |
| Curie Temperature | °C | $T_c$ | >200 |
| Resistivity | $\Omega$ cm | $\rho$ | $1\times10^7$ |

*FIG. 13A*

| Property | Unit | Symbol | 68 | 67 | 61 | 52 | 51 | 44 |
|---|---|---|---|---|---|---|---|---|
| Initial Permeability @ B <10 gauss | | $\mu$ | 20 | 40 | 125 | 250 | 350 | 500 |
| Flux Density @ Field Strength | gauss mT oersted A/m | B H | 2700 270 40 3200 | 2300 230 20 1600 | 2350 235 15 1200 | 4200 420 10 800 | 3200 320 10 800 | 3000 300 10 800 |
| Residual Flux Density | gauss mT | Br | 1000 100 | 800 80 | 1200 120 | 2900 290 | 1200 120 | 1100 110 |
| Coercive Force | oersted A/m | Hc | 7.0 560 | 3.5 280 | 1.8 144 | 0.6 48 | 0.6 48 | 0.45 36 |
| Loss Factor @ Frequency | $10^{-6}$ MHz | tan δ/μ | 500 100 | 150 50 | 30 1.0 | 45 1.0 | 40 1.0 | 125 1.0 |
| Temperature Coefficient of Initial Permeability (20-70°C) | %/°C | | 0.19 | 0.05 | 0.10 | 1.0 | 0.8 | 0.75 |
| Curie Temperature | °C | Tc | >500 | >475 | >300 | >250 | >170 | >160 |
| Resistivity | Ω cm | ρ | $1\times10^7$ | $1\times10^7$ | $1\times10^8$ | $1\times10^9$ | $1\times10^9$ | $1\times10^9$ |
| Power Loss Density 25kHz - 2000 G - 100°C 100kHz - 1000 G - 100°C 500kHz - 500 G - 100°C | mW cm³ | P | --- --- --- | --- --- --- | --- --- --- | --- --- --- | --- --- --- | --- --- --- |
| Recommended Frequency Range | MHz | | | | | | | |
| Application Areas | Low flux density devices. EMI suppression. Power magnetics. Special square loop ferrite. | | <400 --- --- --- | <300 --- --- --- | <100 200 - 2000 --- --- | <25 200 - 1000 --- --- | --- >200 --- --- | --- 25 - 300 --- --- |
| See this page for additional material data. | | | 7 | 8 | 9 | 10 | 11 | 12 |

| 46 | 33 | 85 | 43 | 79 | 31 | 77 | 78 | 73 | 75 | 76 |
|---|---|---|---|---|---|---|---|---|---|---|
| 500 | 600 | 600 | 600 | 1000 | 1500 | 2000 | 2500 | 2500 | 5000 | 10000 |
| 3000 | 2600 | 4300 | 2900 | 4700 | 3400 | 4900 | 4800 | 3800 | 4300 | 4300 |
| 300 | 260 | 420 | 280 | 470 | 340 | 490 | 440 | 390 | 430 | 400 |
| 10 | 5 | 10 | 10 | 5 | 5 | 5 | 5 | 5 | 5 | 5 |
| 600 | 400 | 600 | 600 | 400 | 400 | 400 | 400 | 400 | 400 | 400 |
| 1000 | 1200 | 2700 | 1300 | 1700 | 2500 | 1900 | 1500 | 1500 | 1400 | 1800 |
| 100 | 150 | 270 | 130 | 170 | 250 | 180 | 160 | 150 | 140 | 180 |
| 0.40 | 0.60 | 0.50 | 0.45 | 0.40 | 0.35 | 0.30 | 0.20 | 0.24 | 0.18 | 0.12 |
| 32 | 48 | 40 | 38 | 32 | 28 | 24 | 19 | 19.2 | 13 | 9.6 |
| 80 | 85 | 30 | 25 | 4.0 | 20 | 15 | 4.5 | 10 | 15 | 15 |
| 0.1 | 0.2 | 0.1 | 1.0 | 0.1 | 0.1 | 0.1 | 0.1 | 0.1 | 0.1 | 0.025 |
| — | 0.10 | — | 1.25 | 0.8 | 1.8 | 0.7 | 1.0 | 0.65 | 0.8 | 0.5 |
| >140 | >150 | >200 | >150 | >225 | >130 | >200 | >200 | >180 | >140 | >120 |
| 1×10⁴ | 1×10⁴ | 2×10⁴ | 1×10⁴ | 2×10⁴ | 2×10⁴ | 1×10⁴ | 2×10⁴ | 1×10⁴ | 3×10⁴ | 50 |
| — | — | — | — | — | — | 200 | 75 | — | 140 | — |
| — | — | — | — | 60 | — | — | 85 | — | — | — |
| — | — | — | — | — | — | — | — | — | — | — |
| 25-300 | <3 | — | <10 | <0.75 | 1-300 | <3 | <2.4 | <50 | <0.75 | <0.5 |
| — | — | <0.15 | 25-300 | — | — | — | <0.5 | — | <0.1 | — |
| — | — | — | — | — | — | — | — | — | — | — |
| 13 | 14 | 15 | 16 | 18/19 | 17 | 20/21 | 22/23 | 24 | 25 | 26 |

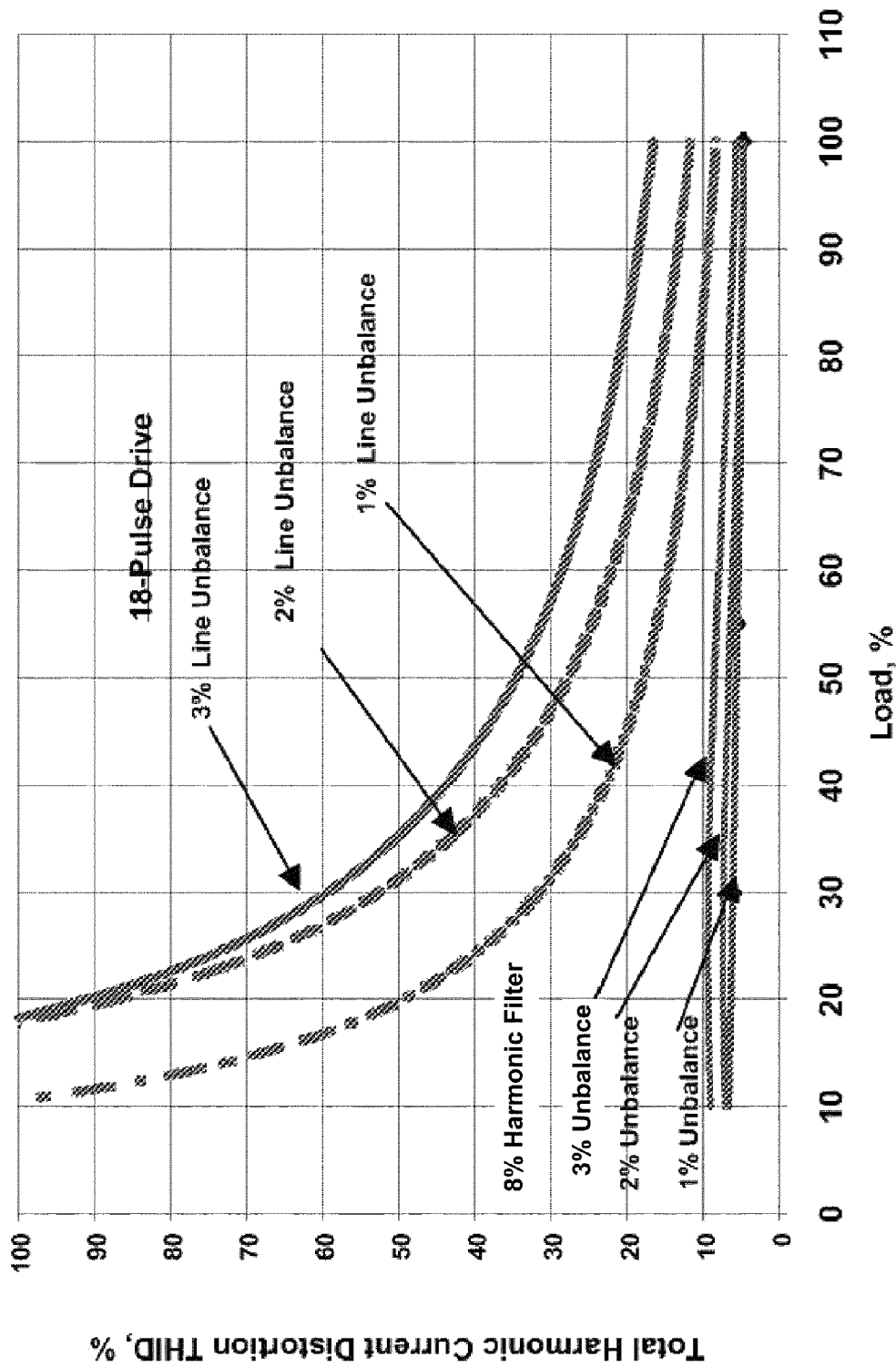
FIG. 21 18 Pulse Drive vs. 6-pulse VFD with Harmonic Filter

COMBINED ACTIVE AND PASSIVE HARMONIC MITIGATION DEVICES AND APPLICATIONS THEREOF

RELATED APPLICATIONS

This application claims the priority of U.S. Provisional Appln. No. 61/479,738, filed Apr. 27, 2011, entitled "COMBINED ACTIVE AND PASSIVE HARMONIC MITIGATION DEVICE," which is incorporated herein by reference in their entirety for all purposes.

TECHNICAL FIELD

In some embodiments, the instant invention relates to current filters and/or inductors applications thereof.

BACKGROUND

Electrical distribution systems, for example in a building or industrial facility, typically supply electricity to non-linear loads, such as adjustable speed motor drives, uninterruptible power supplies (UPS), battery chargers, servo drives, and welders. These loads produce various levels of current at harmonic frequencies in the power distribution system with the harmonic spectrum depending upon the nature of the load. Typically, variable frequency drives can experience substantial harmonic distortion caused by non-linear loads. Typically, magnitude of harmonic currents in an individual non-linear load depends on the total effective input reactance, which can be a product of a source reactance plus added line reactance.

SUMMARY OF INVENTION

In some embodiments, the instant invention can provide a harmonic mitigating device that can include at least the following components: a) at least one active filter; b) at least one passive filter; c) at least one control switch, wherein the at least one control switch operationally controls whether the at least one active filter or the at least one passive filter can be utilized by the harmonic mitigation device to mitigate at least one harmonic current flow.

In some embodiments, the at least one control switch operationally switches the harmonic mitigation device from utilizing the at least one active filter to utilizing the at least one passive filter when a current load exceeds a predetermined percent of a full current load. In some embodiments, the predetermined percent is at least 20 percent. In some embodiments, the at least one passive filter is i) a passive single phase filter or ii) a passive three phase filter.

In some embodiments, the at least one passive filter can include at least the following components: at least one FAP positioned along at least one magnetic flux path; wherein the at least one FAP is a high permeability core gap piece; and wherein the at least one FAP has an effective magnetic permeability that varies based on at least in part on one of the following factors:
 i) at least one magnetic flux through the at least one FAP, and
 ii) sufficient heating of the at least one FAP.

In some embodiments, the sufficient heating is to Curie temperature of the at least one FAP. In some embodiments, the at least one passive filter further comprises at least one MAP, wherein the at least one MAP is a metallic gap piece, wherein the at least one MAP is located in sufficient proximity to the at least one FAP hereby resulting in the sufficient heating by at least one MAP of the at least one FAP. In some embodiments, the at least one passive filter further comprises at least one insulator, wherein the at least one insulator is positioned along the at least one magnetic flux part hereby further adjusting an inductance of the inductor. In some embodiments, the at least one FAP comprises at least one ferrite material. In some embodiments, the at least one soft ferrite material is selected from a group consisted of Nickel-Zinc ferrite material, Magnesium-Zinc ferrite material, and Manganese-Zinc ferrite material.

In some embodiments, the at least one FAP can include at least one molyperalloy power material. In some embodiments, the at least one molyperalloy power material contains at least 50 percent weight of Nickel, at least 20 percent weight of Iron, and the balance comprising another suitable material. In some embodiments, the Curie temperature is between about 130 and about 1200 degrees Celsius.

In some embodiments, the at least one FAP comprises at least one first FAP part and at least one second FAP part wherein the at least one first FAP part and the at least one second FAP part are separate structures. In some embodiments, the at least one first FAP part differs from the at least one second FAP part in at least one of the followings characteristics: composition, size, and shape.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIGS. 13A-13I illustrate certain features of some further embodiments of the present invention.

FIG. 14A illustrates certain features of some embodiments of the present invention.

FIG. 14B illustrates certain features of some further embodiments of the present invention.

FIG. 21 illustrates certain features of some further embodiments of the present invention.

Figure 1A:
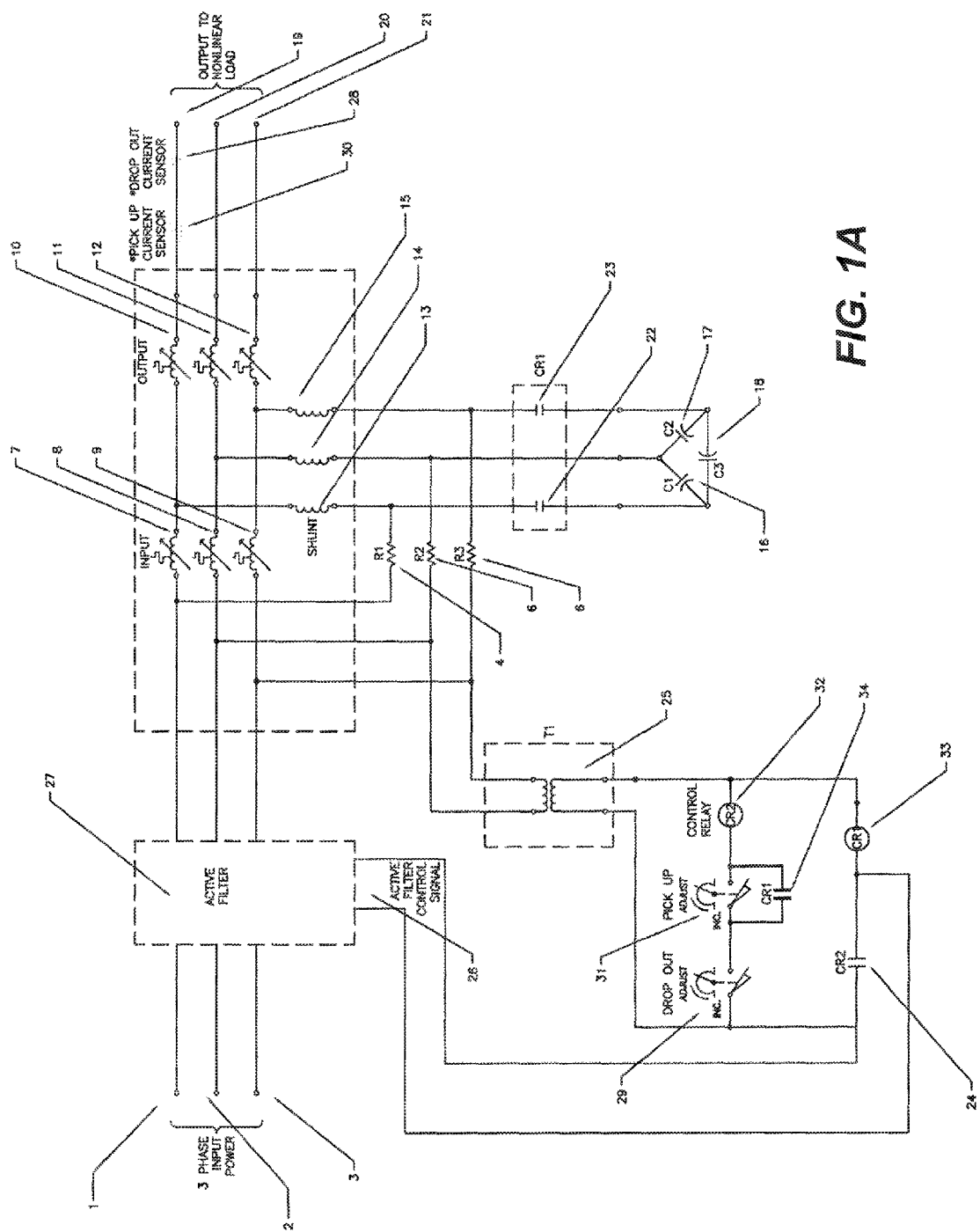
FIGS. 1A-1D illustrates certain features of some embodiments of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Further, the terms "substantial," "substantially," "similar," "similarly," "analogous", "analogously," and any combination thereof mean that differences between compared features or characteristics is less than 25% of the respective values/magnitudes in which the compared features or characteristics are measured and/or defined.

As used herein, "high permeability" means a magnetic permeability that is at least 1000 times greater than the permeability of air, and "low permeability" means a magnetic permeability that is less than 100 times the permeability of air.

In some embodiments, the instant invention can be used as a harmonic mitigating device between a power distribution system and one or more harmonic-generating loads and can result in an sufficient harmonic mitigation at full load operation. In some embodiments, the instant invention allows to improve the harmonic mitigation at full load and, at the same time, to bring the harmonic mitigation to an acceptable level at light loads, without resulting in filter's increased physical size, complexity and/or cost.

A typical active filter maintains near unity power factor independent of whether it is lightly loaded or fully loaded. The typical passive filter device can operate at near unity power factor at near full load, but can introduce a leading power factor at light loads. The superior harmonic mitigation of the typical active filter costs many times more than the typical passive filter solution.

FIG. 1A shows a schematic diagram of some embodiments of the instant invention. In one embodiment, a harmonic mitigating device that connects between a power distribution system and a nonlinear load that has both active filter and passive filter modes of operation. In one embodiment, the active filter portion operates at light loads and the passive filter portion operates during heavier loading. In one embodiment, the light loads are loads when current is below about 50% of the full load. In one embodiment, the heavy loads are loads when current is above about 50% of the full load.

In one embodiment, the instant invention relates to a method to combine an active filter and a passive filter.

In one embodiment, an active filter is a type of analog electronic filter that uses one or more active components i.e. voltage amplifiers or buffer amplifiers (e.g., a vacuum tube, or solid-state (transistor or operational amplifier)). In some embodiments, active filter circuit configurations (electronic filter topology) can include, but not limited to:

1) Sallen and Key, and voltage-controlled voltage-source (VCVS) filters (low dependency on accuracy of the components);

2) State variable and biquadratic filters;

3) Twin T filter (fully passive);

4) Dual Amplifier Bandpass (DABP);

5) Wien notch;

6) Multiple Feedback Filter;

7) Fliege (lowest component count for 2 op amps (operational amplifier) but with good controllability over frequency and type);

8) Akerberg Mossberg (a topology that offers complete and independent control over gain, frequency, and type); and 9) Matrix PureSine® active filters of MTE Corporation.

In some embodiments, a single active filter can include two or more active filters that are operatively connected to perform as the single active filter.

In some embodiments, a smaller active filter operates at lighter loads and the passive filter operates at heavier loads. In one embodiment, the instant invention provides near unity power factor regardless of the amount of loading. In one embodiment, the unity power factor is measured with a power quality analyzer. In one embodiment, this hybrid solution to harmonic mitigation can be more expensive than a purely passive solution but much less expensive than a purely active filter solution.

Some embodiments of the instant invention can be constructed in accordance with the schematic diagram of a combined active and passive harmonic mitigation device shown in FIGS. 1A-1D, 2A-B, 3, and 4A-B. In some embodiments, there are three input coils 7, 8 and 9, three output coils 10, 11, and 12, and three shunt coils 13, 14, and 15. In one embodiment, there are three damping resistors 4, 5, and 6. In one embodiment, there is a three phase capacitor assembly shown as 16, 17, and 18. In some embodiments of the instant invention, as shown in FIGS. 1A-1D, there can be a shunt filter formed by inductances 13, 14, and 15, and capacitances 16, 17, and 18, and the shunt filter can be tuned to the dominant harmonic current. In some embodiments of the instant invention, these input coils provide impedance to minimize harmonic current flow and detune the shunt filtering formed by the inductances 13, 14, and 15, and the capacitances 16, 17, and 18. In some embodiments of the instant invention, the input coils 7, 8, and 9 can lower the parallel resonant frequency of the input of the filter to a power system. In some embodiments of the instant invention, the output inductances 10, 11, and 12 can smooth out the currents produced by the load.

Figure 1B:
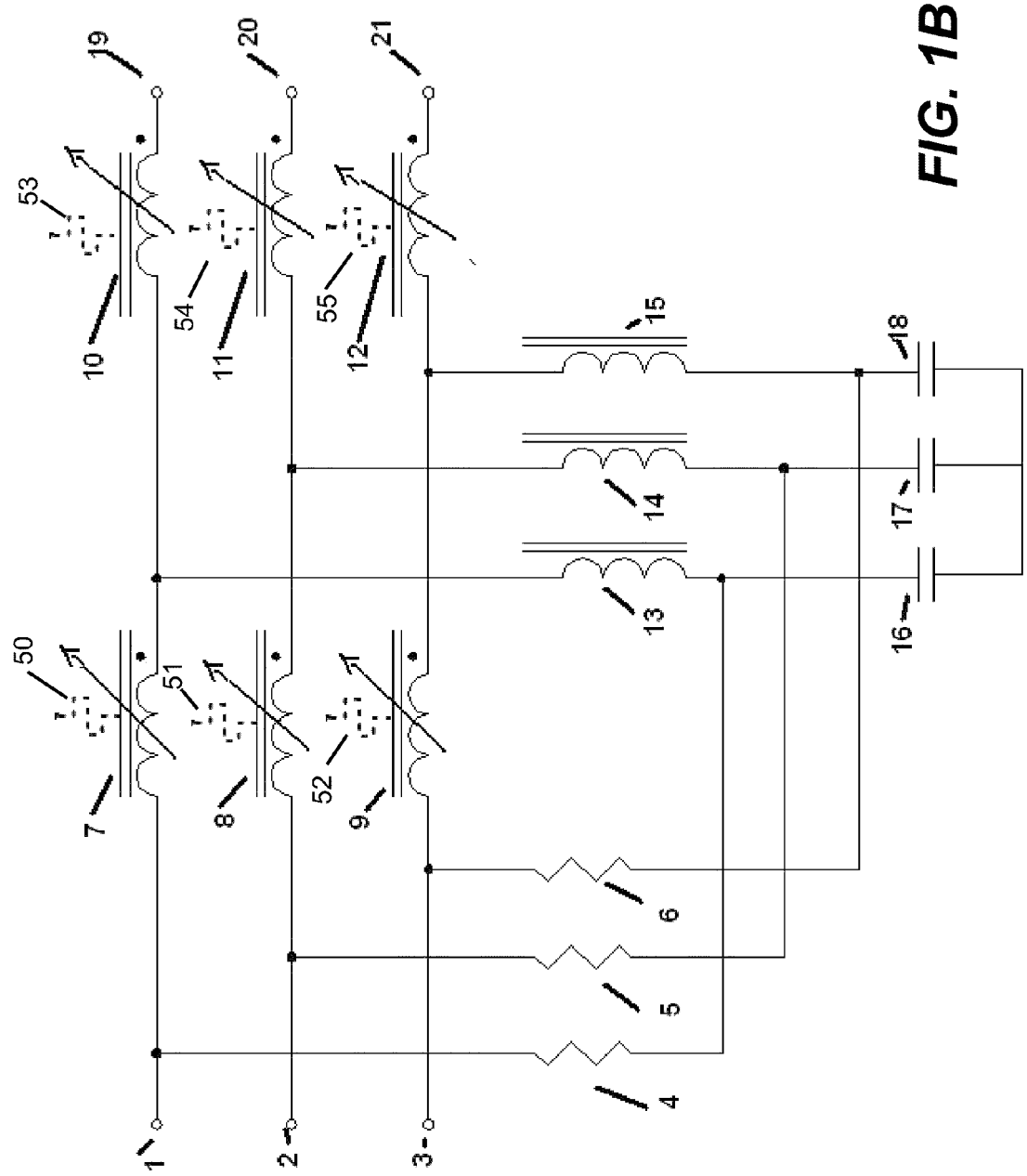
Figure 1C:
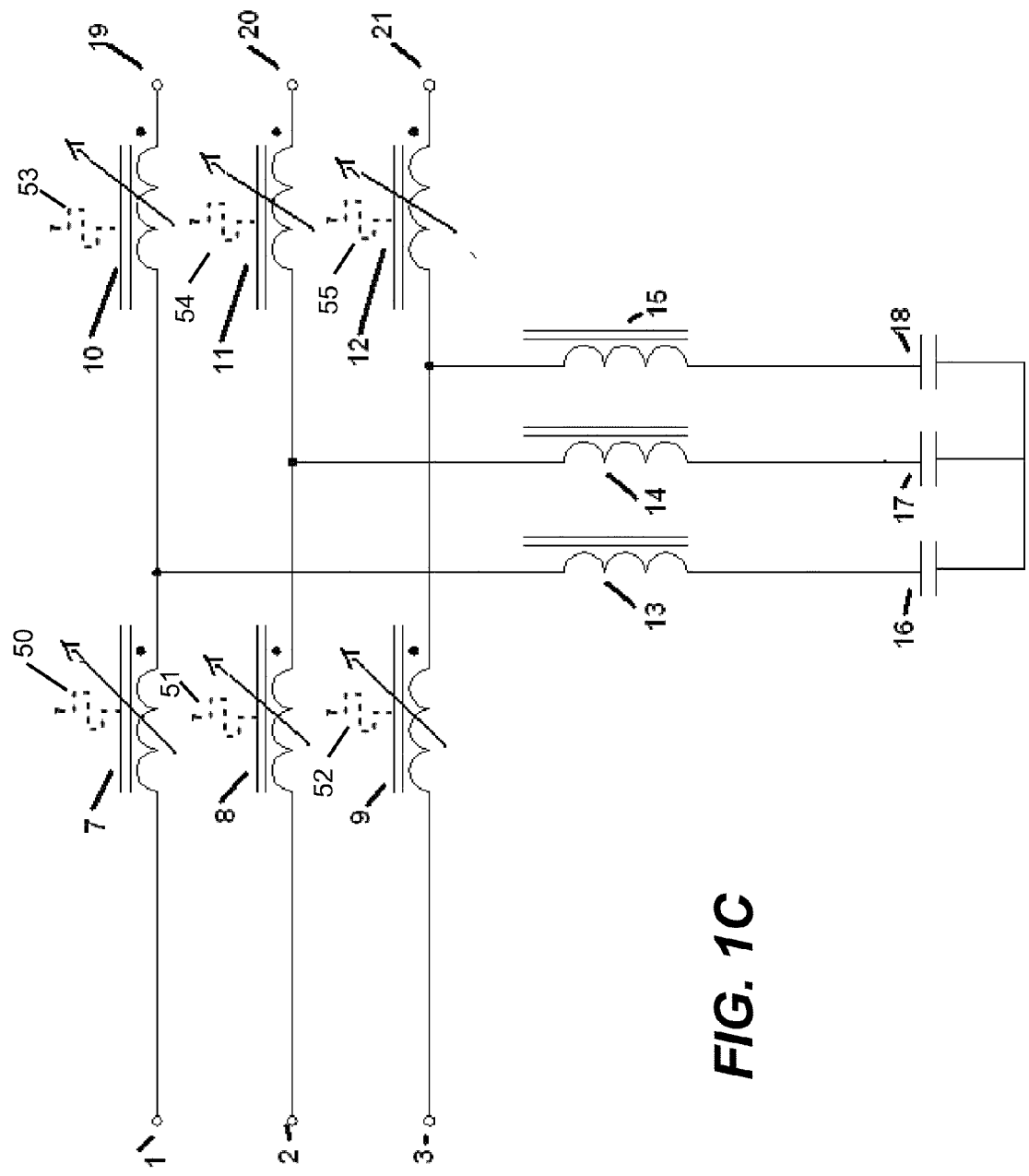
Figure 1D:
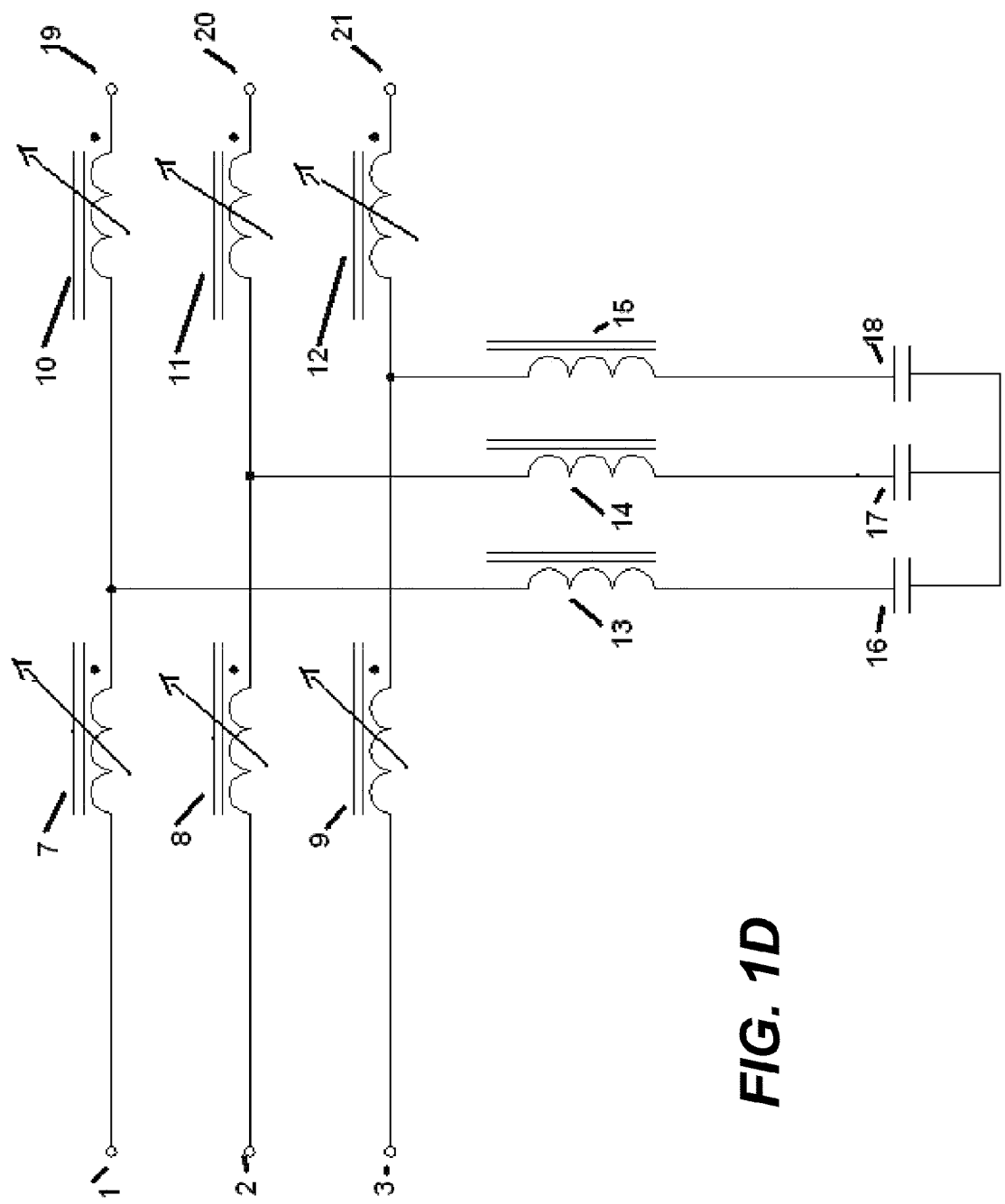

In some embodiments of the instant invention, as shown in FIG. 1A-1B, there can be resistances 4, 5, and 6. In some embodiments of the instant invention, these resistances 4, 5, and 6 can be used to damp the voltage and current peaks during transients.

In one embodiment, when the non-linear load 19, 20, 21 is initially turned on the contactors 22 and 23 are open. In one embodiment, the capacitors 16, 17, and 18 are not contributing to the harmonic mitigation. In one embodiment, the contactor 24 is open so the voltage on the secondary of the transformer 25 is applied to 26, the active filter control signal. In one embodiment, when the control signal is present the active filter 27 is on. In one embodiment, the input inductances 7, 8, 9 and the output inductances 10, 11, 12 also contribute to the harmonic mitigation.

In one embodiment, once the load 19, 20, 21 current exceeds about 30% of the full load current, there is a normally open current controlled switch 28, 29 that closes. In some embodiments, when the load exceeds about 20% of the full load current, there is a normally open current controlled switch 28, 29 that closes. In some embodiments, when the load exceeds about 25% of the full load current, there is a normally open current controlled switch 28, 29 that closes. In some embodiments, when the load exceeds about 35% of the full load current, there is a normally open current controlled switch 28, 29 that closes. In some embodiments, when the load exceeds about 40% of the full load current, there is a normally open current controlled switch 28, 29 that closes.

In one embodiment, the location 28 is where the current is sensed and 29 is the location of the switch. In one embodiment, at this operating condition, the active filter 27 and the input inductances 7, 8, 9 and the output inductances are contributing to the harmonic mitigation.

In one embodiment, once the load 19, 20, 21 current is increased to about 40% of full load current, there is a normally open current controlled switch 30, 31 that closes. In one embodiment, once the load 19, 20, 21 current is increased to about 30% of full load current, there is a normally open current controlled switch 30, 31 that closes. In one embodiment, once the load 19, 20, 21 current is increased to about 35% of full load current, there is a normally open current controlled switch 30, 31 that closes. In one embodiment, once the load 19, 20, 21 current is increased to about 45% of full load current, there is a normally open current controlled switch 30, 31 that closes. In one embodiment, once the load 19, 20, 21 current is increased to about 50% of full load current, there is a normally open current controlled switch 30, 31 that closes.

In one embodiment, there is a difference of least 5% of current load between states when the current controlled switch 28, 29 closes and when the current controlled switch 30, 31 closes. In one embodiment, there is a difference of least 10% of current load between states when the current controlled switch 28, 29 closes and when the current controlled switch 30, 31 closes. In one embodiment, there is a difference of least 7.5% of current load between states when the current controlled switch 28, 29 closes and when the current controlled switch 30, 31 closes.

In one embodiment, the location 30 is where the current is sensed and 31 is where the switch is located. In one embodiment, since both switches 29 and 31 are closed, the control relay coil 32 is energized. In one embodiment, since the control relay coil is energized, relay 24 closes. In one embodiment, since the control relay 24 is closed, the control relay coil 33 is energized, so normally open relays 22, 23 and 34 close. In one embodiment, since relay 24 is closed the control 26 signal is zero going to the active filter 27 so it turns off. In one embodiment, the relays 22 and 23 add the capacitors assembly represented by 16, 17 and 18 to the circuit. In one embodiment, the circuit is operating in a purely passive filter mode of operation up to full load operation.

In one embodiment, if the load 19, 20, 21 current is reduced back to 40% of the full load, the current controlled normally open switch 30, 31 is returned back to open state, and the combined passive and active harmonic mitigation device continues to operate in passive filter mode.

In one embodiment, if the load (19, 20, 21) current is reduced to below 30% of the full load operation, both current sense switches 29 and 31 are open. In one embodiment, all of the relays 32 and 33 de-energize, all of the control relays (22, 23, 24, 34,) are open. In one embodiment, since relay 24 is open, the control signal to the active filter 27 turns it back on. In one embodiment, only the active filter 27 and the line inductances (7, 8, 9, 10, 11, 12) are contributing to the harmonic mitigation and power factor correction.

In one embodiment, the operation of the device of the instant invention can create hysteresis. In one embodiment, the operation of the filter becomes passive at either 30% or 40% full load operation. In one embodiment, the operation of the filter becomes passive at either 30% or 40% full load operation. In one embodiment, the operation of the instant invention can depend on whether the filter is going from light load to a heavier load or from a heavier load to a light load. In one embodiment, the created hysteresis can prevent device "chattering," which is the state at which the filter would quickly shift from its passive mode to active mode numerous times very quickly at a specific load current if it was not for this hysteresis. This chattering can reduce the life of the filter components.

In one embodiment, the increased line impedance results in having to use a smaller active filter, which can significantly reduce the costs. In one embodiment, instead of having to buy one active filter sized for the full load harmonic current, the active filter is only sized for the harmonic current at lighter loads, and the passive filter is sized according to the full load operation. In one embodiment, the estimate cost reduction related to the use of the combined active and passive mitigation device as opposed to a purely active filter solution can be 50%. In one embodiment, the instant invention can be used for a 480 V 786 A load application.

In some embodiments of the instant invention, the inductor core structure, other than the gap material, can be constructed in accordance with U.S. Pat. No. 7,142,081, entitled "MULTIPLE THREE-PHASE INDUCTOR WITH A COMMON CORE," whose disclosure in its entirety is incorporated herein for all purposes, specifically for construction of the inductor core.

In some embodiments, the inductor core structure of the instant invention can further contain additional high permeability core gap piece(s).

In some embodiments of the instant invention, the high permeability core gap pieces are collectively called "FAPs." In some embodiments, the FAPs can be made of composition(s) that contain ferrites. Ferrites are chemical compounds consisting of ceramic materials with iron(III) oxide (Fe2O3) as their principal component. Ferrites are usually ferrimagnetic ceramic compounds derived from iron oxides such as hematite (Fe2O3) or magnetite (Fe3O4) as well as oxides of other metals. In terms of their magnetic properties, the different ferrites are often classified as "soft" or "hard", which refers to their low or high magnetic coercivity. The low coercivity means the material's magnetization can easily reverse direction without dissipating much energy (hysteresis losses), while the soft ferrite material's high resistivity prevents eddy currents. Typically, soft ferrite has a cubic crystalline structure with the chemical formula MO.Fe2O3 where Fe2O3 is iron oxide and MO refers to divalent metal (i.e: zinc, nickel, manganese and copper) oxides in various amounts.

In some embodiments of the instant invention, the ferrite material of FAPs structures can be made from any suitable soft ferrite material and/or alloy such as, but not limiting to, Nickel-Zinc ferrite material, Magnesium-Zinc ferrite material, Manganese-Zinc ferrite material, and any other materials exhibiting desired characteristics as utilized by the instant invention. In some embodiments, for FAPs structures, the instant invention can utilize, but is not limited to, one or more suitable materials sufficiently similar to soft ferrite materials produced by Fair-Rite Products Corp. such as Manganese zinc (Fair-Rite 31, 33, 73, 75, 76, 78 and 79 material), Nickel zinc (Fair-Rite 42, 43, 44, 51, 52, 61, 67, and 68 material), Manganese (Fair-Rite 85 material), and Magnesium zinc (Fair-Rite 46 material). FIGS. 14A-B provide some characteristics of Fair-Rite' ferrite materials that can be utilized for FAPs in accordance with principle(s) of the instant invention. Properties identified in FIGS. 14A-B were measured at room temperature, unless otherwise specified, using medium size toroidal cores. In some embodiments, for FAPs, the instant invention can utilize material(s) whose characteristics and behaviors are substantially analogous or similar to the characteristics identified in FIGS. 14A-B so that the selected ferrite material(s) function(s) as required in accordance with principle(s) of the instant invention.

In some embodiments of the instant invention, FAPs possess a desired Curie temperature within a range of about 100 to 150 degrees Celsius. In some embodiments of the instant invention, FAPs possess a desired Curie temperature within a range of about 140 to 160 degrees Celsius. In some embodiments of the instant invention, FAPs possess a desired Curie temperature at about 250 degrees Celsius. In some embodiments of the instant invention, FAPs possess a desired Curie temperature at about 750 degrees Celsius. In some embodiments of the instant invention, FAPs possess a desired Curie temperature at about 1000 degrees Celsius. In some embodiments of the instant invention, FAPs possess a desired Curie temperature at about 1200 degrees Celsius or higher. In some embodiments of the instant invention, FAPs possess a desired Curie temperature at about 1200 degrees Celsius or lower.

In some embodiments, any suitable ferrite material can be used to achieve adaptive passive filtering of the instant invention. For example, in some embodiments, Nickel-Zinc ferrite material can have a Curie temperature of about 140 degrees Celsius. Curie temperature is typically the temperature at which a ferromagnetic or a ferrimagnetic material typically becomes paramagnetic on heating; the effect is reversible. Typically, a magnet would lose its magnetism if heated above the Curie temperature. In one example, Nickel-Zinc ferrite material is typically used as complete cores on components operating at 1 MHz or more.

Figure 12:
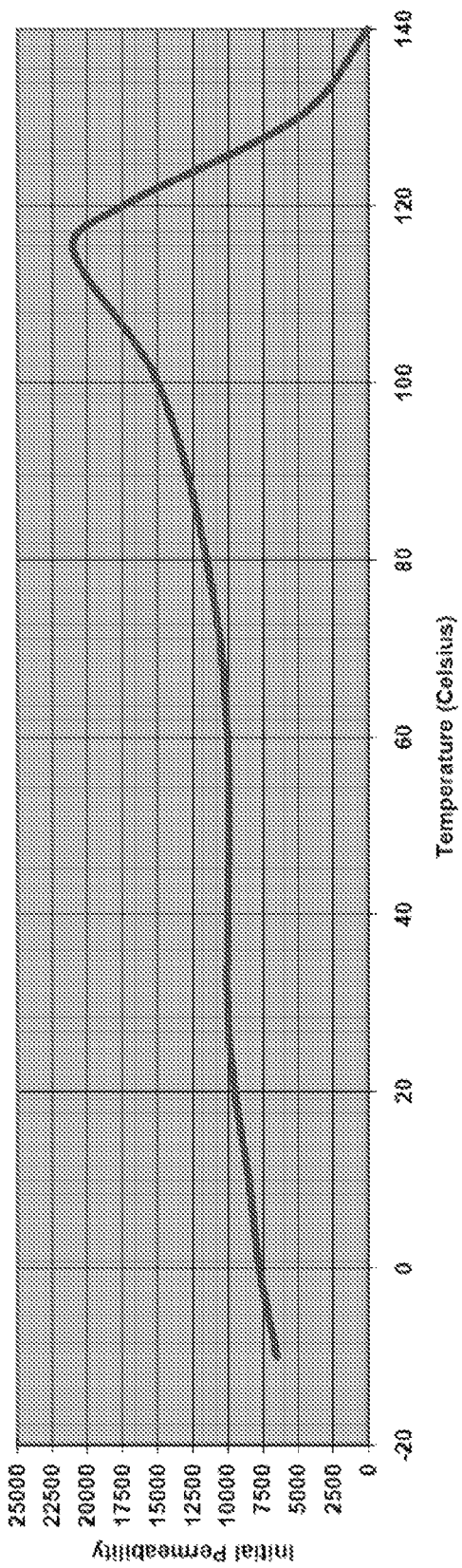
FIG. 12 illustrates certain features of some further embodiments of the present invention.

In some embodiments, the instant invention can utilize TSC Ferrite International F010K material for FAPs. FIG. 12 illustrates the magnetic permeability characteristics of typical TSC Ferrite International F010K material versus temperature. The typical TSC Ferrite International F010K material becomes nearly non-magnetic at about 140 degrees Celsius.

Figure 13B:
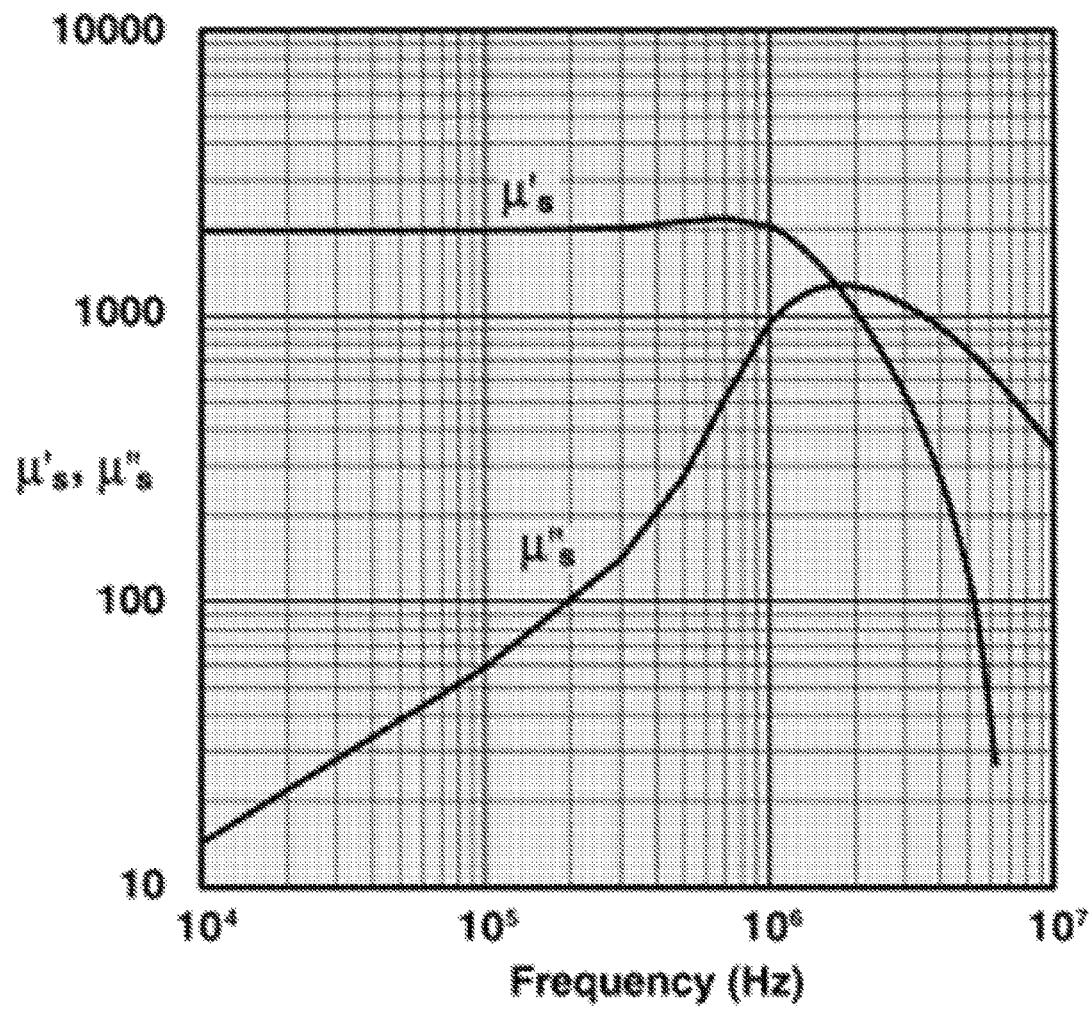
Figure 13C:
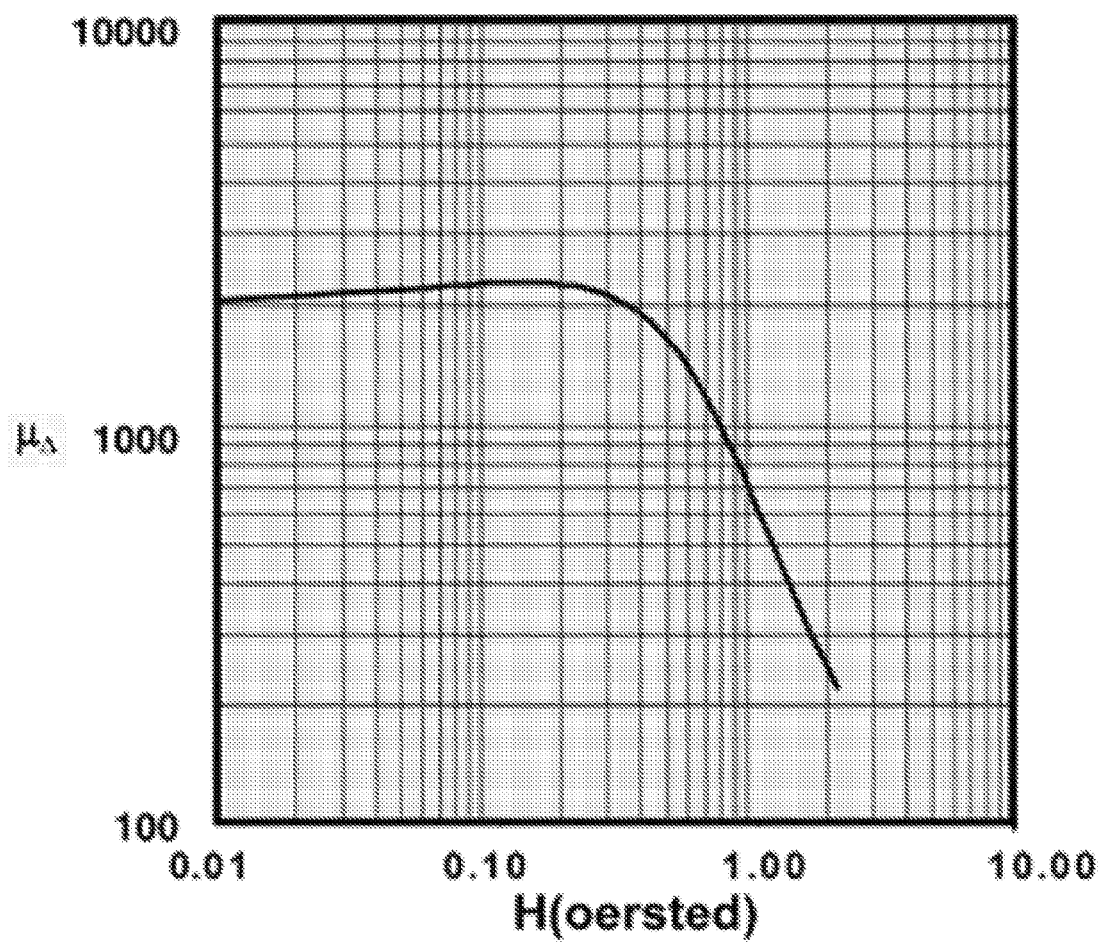
Figure 13D:
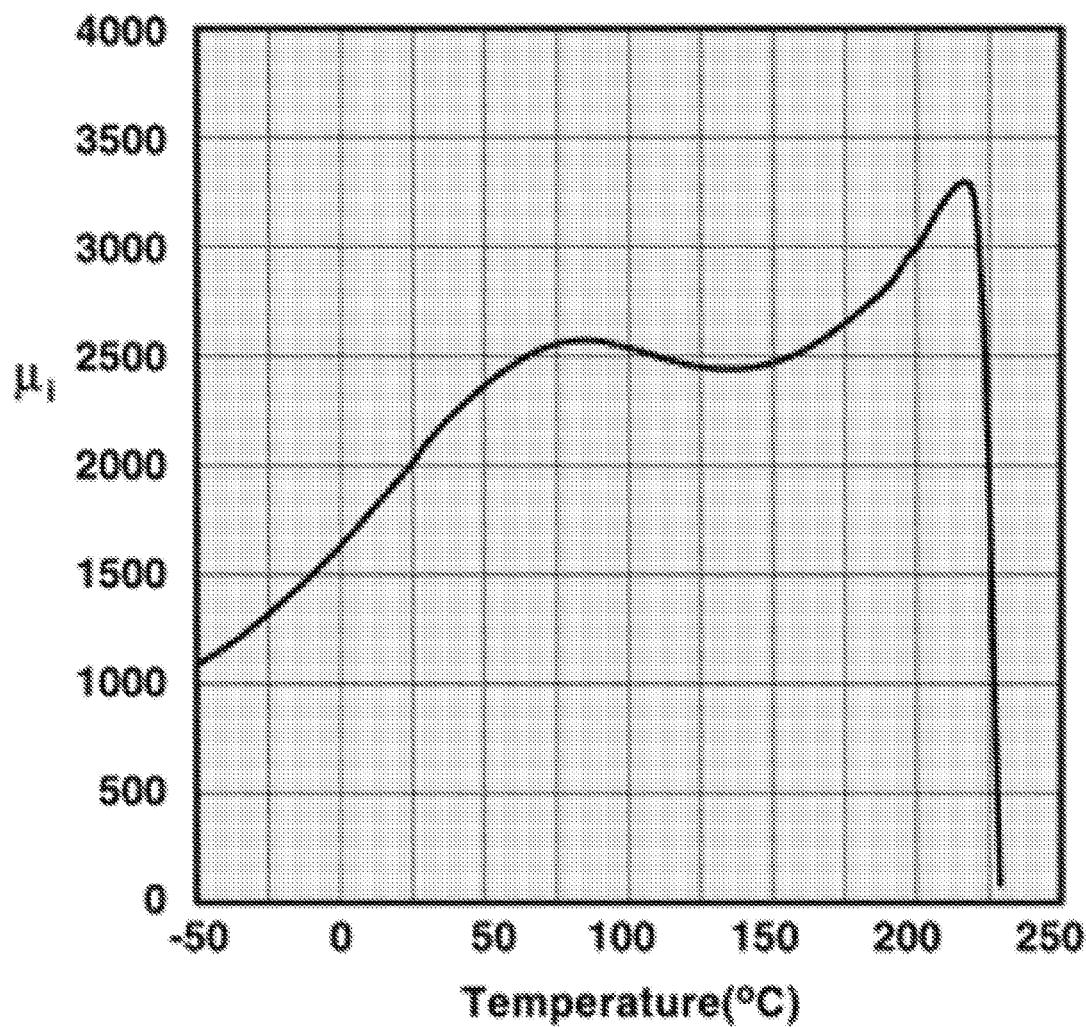
Figure 13E:
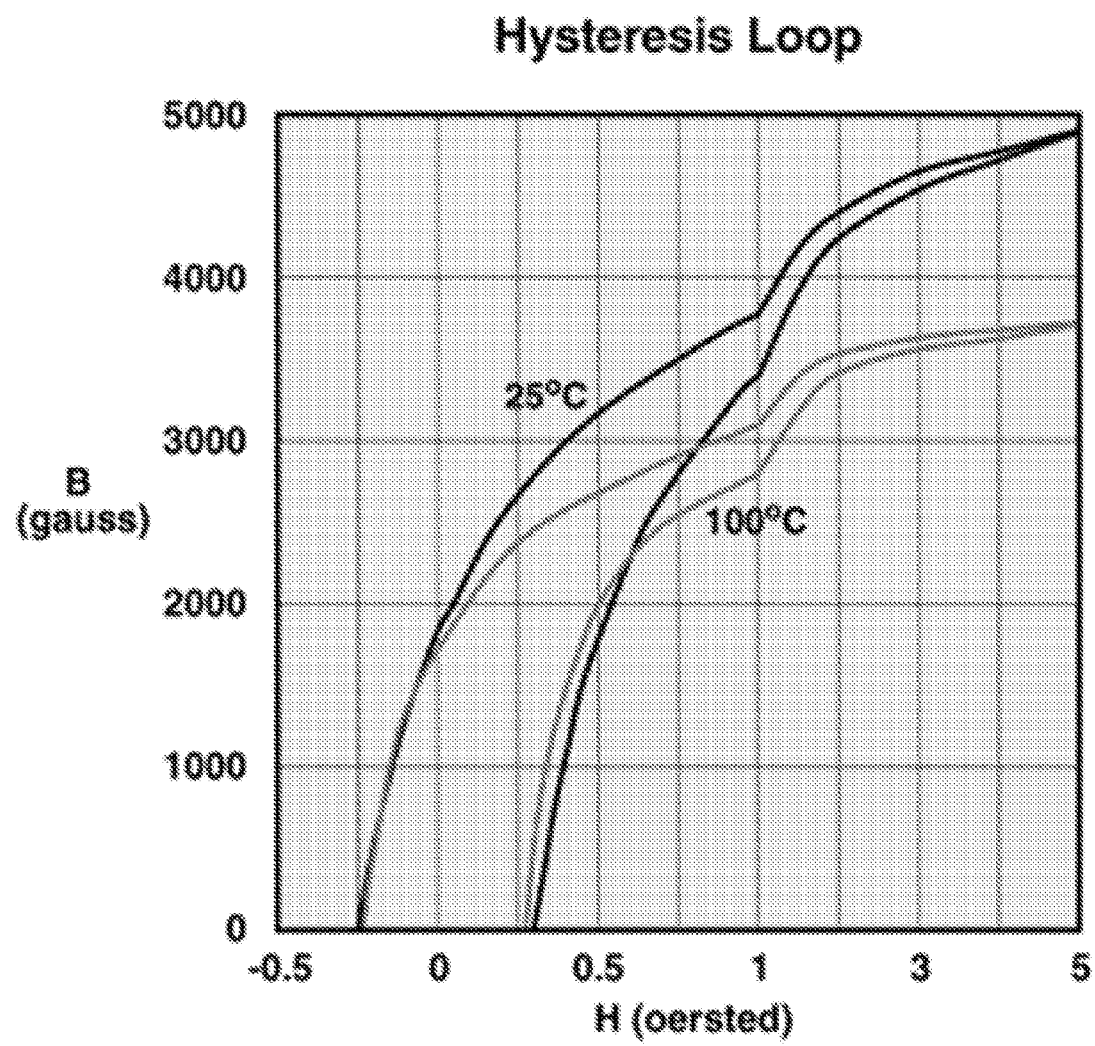
Figures 13F, 13G:
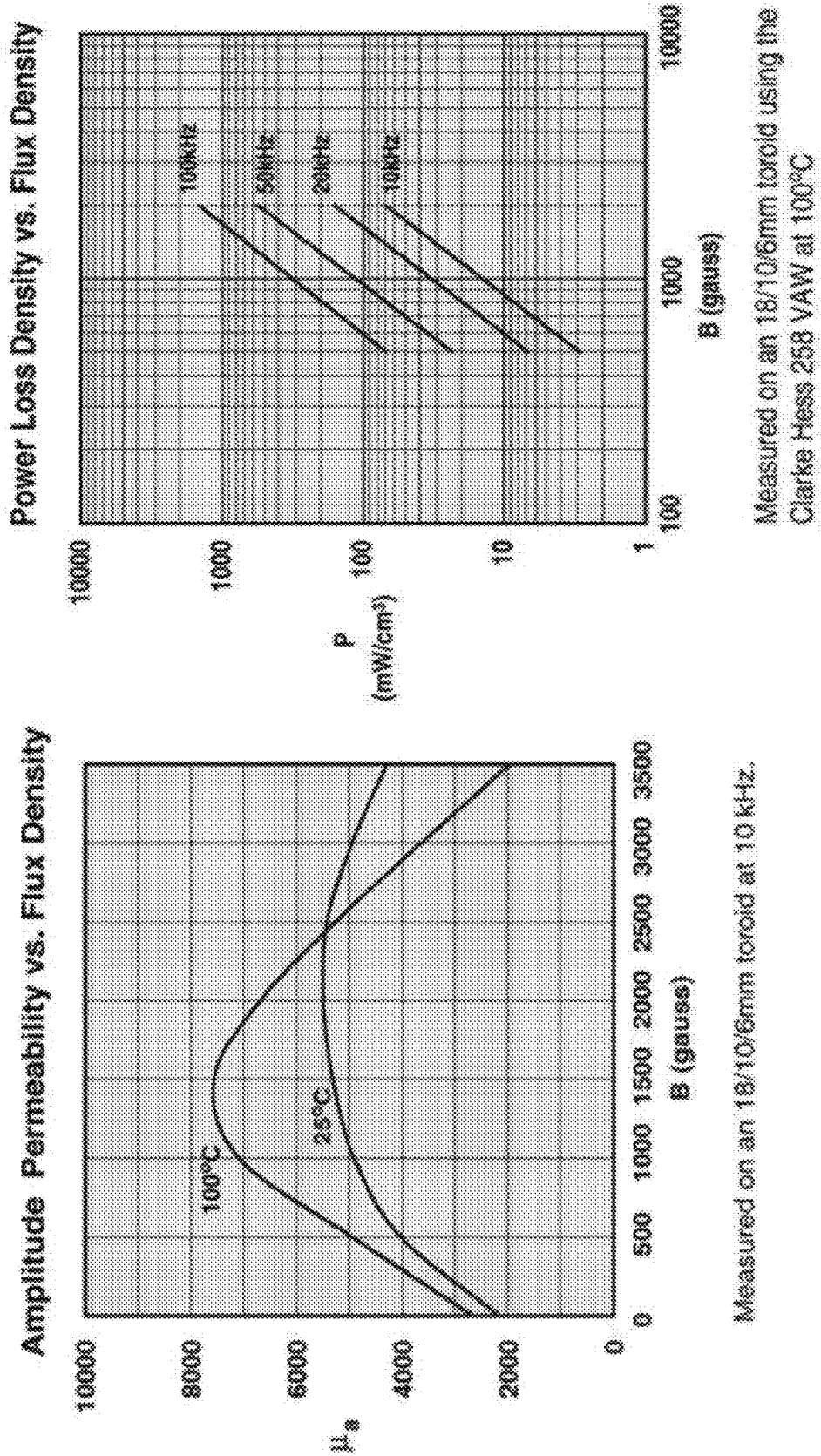
Figures 13H, 13I:
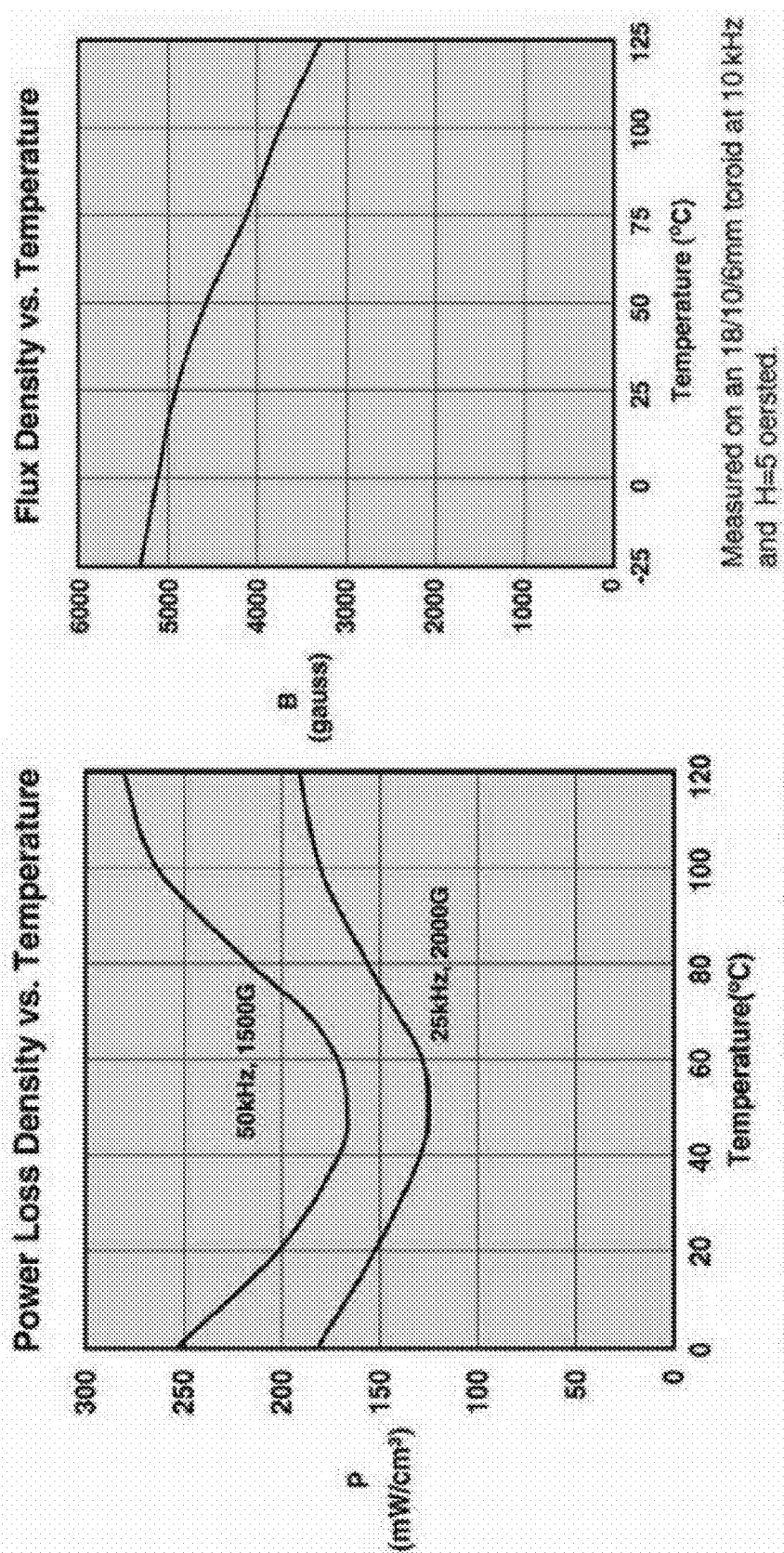

In some embodiments, the instant invention can utilize Manganese-Zinc ferrite material having characteristics given in FIG. 13A and that exhibits behaviors shown in FIGS. 13B-13I. In some embodiments, for FAPs, the instant invention can utilize some other material(s) whose characteristics and behaviors are substantially analogous or similar to the characteristics and behaviors of the Manganese-Zinc ferrite material so that the other material(s) sufficiently performs function(s) required in accordance with principle(s) of the instant invention.

In some embodiments, for FAPs structures, one or more of particular ferrite materials is selected based at least in part on a particular application of a device for which respective FAPs are to be used. In some embodiments, for FAPs structures, one or more of particular ferrite materials is selected based at least in part on the particular application and operational condition(s) of the device for which respective FAPs are to be used. In some embodiments, for FAPs structures, one or more of particular ferrite materials is selected based at least in part on the selected ferrite material having a Curie temperature within the maximum operating temperature of the particular device.

In one example, a typical insulation system temperature of an inductive device is, inter alia, approximately 200 degrees Celsius. In one example, at light loads, a temperature of the inductor is well below the Curie temperature of the FAPs. In one example, since a temperature of the inductor is well below the Curie temperature of the FAPs, high permeability FAPs (35, 35a, 36, 36a, 37, and 37a) hence can increase the inductance of the input inductances 7, 8, and 9 and output inductances 10, 11, and 12 coils, see for example FIGS. 2A-B and 4A-B, by adding more high permeability magnetic material in the magnetic path of the coils. In one example, the increased inductance can reduce the current harmonic distortion at light loads. In one example, the increased inductance at light loads also can initially increase the current harmonic distortion at full load because it can create non-linear inductance characteristics in the filter.

In some embodiments of the instant invention, the permeability of FAPs can increase to a high permeability once the temperature of FAPs is reduced below the Curie temperature when the inventive inductive device is at reduced load. For example, in some embodiments of the instant invention, as shown in FIGS. 1-4, at light loads, before FAPs (35, 35a, 36, 36a, 37, and 37a) are saturated with low current through inductances (7, 8, 9, 10, 11, and 12), FAPs would have an elevated inductive impedance which can reduce the harmonic currents, especially high harmonic currents. In some embodiments of the instant invention, as the load current is increased, FAPs (35, 35a, 36, 36a, 37, and 37a) would start to magnetically saturate. In some embodiments of the instant invention, while FAPs (35, 35a, 36, 36a, 37, and 37a) still help to elevate impedance to help to reduce harmonic distortion, FAPs (35, 35a, 36, 36a, 37, and 37a) can also create non-linear inductance characteristics in the inductances (7, 8, 9, 10, 11, and 12) which can increase current harmonic distortion.

In some embodiments of the instant invention, initially, as the load current through the inductances (7, 8, 9, 10, 11, and 12) is increased to near full load, FAPs (35, 35a, 36, 36a, 37, and 37a) would have the net effect of increasing harmonic distortion similar to devices without FAPs (35, 35a, 36, 36a, 37, and 37a). However, in some embodiments, when FAPs' (35, 35a, 36, 36a, 37, and 37a) temperature exceed their Curie temperature due to the full load losses, FAPs (35, 35a, 36, 36a, 37, and 37a) become non-magnetic. When FAPs (35, 35a, 36, 36a, 37, and 37a) are non-magnetic condition, the inductances (7, 8, 9, 10, 11, and 12) are sufficiently close to being linear inductances throughout the operating range, and the inventive device operates as if FAPs (35, 35a, 36, 36a, 37, and 37a) were not present, eliminating the detrimental effects of the non-linearities at full load.

In some embodiments, in situations of operating at full load for an extended period of time and then returning to light load, FAPs (35, 35a, 36, 36a, 37, and 37a) would initially be non-magnetic and positive effects of any increased inductive impedance would not be apparent until the particular inventive device is cooled down and FAPs' (35, 35a, 36, 36a, 37, and 37a) temperature is below their Curie temperature.

In some embodiments of the instant invention, FAPs can also be made from suitable materials such as, but not limiting to, powdered iron or sendust. In some embodiments, the suitable FAPs materials can have non-ferrite-based compositions and can have theirs Curie temperatures over about 400 degrees Celsius. In some embodiments of the instant invention, the harmonic mitigating device constructed with the suitable FAPs materials can allow for improved performance at lighter loads.

In some embodiments, the FAPs materials can be composed of one or more materials that can have suitable relative permeability of about 14 to about 550. The relative permeability ($\mu_r$), is the ratio of the permeability of a specific medium to the permeability of free space given by the magnetic constant:

$$\mu_0 = 4\pi \times 10^{-7} \frac{N}{A^2}$$

(i.e., $4\pi \times 10^{-7} \approx 1.2566370614 \ldots \times 10^{-6}$ H·m$^{-1}$ or N·A$^{-2}$). In some embodiments, regarding the suitable materials with permeability that is less than the ferrites' permeability, a thicker FAP piece of such material may be required and/or less insulation material (e.g., Nomex) in the gaps. In some embodiments, the suitable materials with permeability that is less than the ferrites' permeability can have Curie temperatures up to about 940 degrees Celsius.

In some embodiments, the effective magnetic permeability or effective permeability is dependent on the initial permeability of a magnetic material and dimensions of a gap and circuit.

In some embodiments, the suitable FAP materials can be made from molypermalloy powder materials having composition(s) of about 80% nickel and about 20% iron, with the balance being other suitable compound(s)/element(s). In some embodiments, the suitable FAP materials can be made from molypermalloy powder materials having composition(s) of about 50% nickel and about 50% iron, with the balance being other suitable compound(s)/element(s). In some embodiments, the suitable FAP materials can be made from molypermalloy powder materials having composition(s) of about 70% nickel and about 30% iron, with the balance being other suitable compound(s)/element(s). In some embodiments, the suitable FAP materials can be made from molypermalloy powder materials having composition(s) of about 70% nickel and about 20% iron, with the balance being other suitable compound(s)/element(s). In some embodiments, the suitable FAP materials can be made from alloy(s) of iron, silicon and aluminum.

In some embodiments, the suitable FAP materials are materials that can exhibit variable permeability under different conditions, such as, but not limiting to, changes in magnetic flux density (B) and/or their temperatures. For example, in some embodiments, the permeability of the suitable FAP materials can substantially decrease when they are subjected to a sufficient magnetic flux density (B). For example, in some embodiments, the permeability of the can substantially decrease when they are subjected to sufficiently high temperature(s). For example, in some embodiments, the permeability of the suitable FAP materials can substantially decrease when being subjected to the sufficient magnetic flux density (B) and the sufficiently high temperature(s). For example, in some embodiments, the sufficiently high temperature(s) are the Curie temperature(s) of the suitable FAP materials.

In some embodiments of the instant invention, the inductance change can be linear. In some embodiments of the instant invention, only FAPs pieces are saturate. In some embodiments of the instant invention, there is (are) insignificant noise and/or heat generation from FAPs. Some embodiments of the instant invention can be easy to construct. Some embodiments of the instant invention can result moderate tooling cost. Some embodiments of the instant invention can be easily adapted to existing filter designs. Some embodiments of the instant invention, having Curie temperature of about 140 degrees Celsius, provide optimally flat inductance at rated current.

Figure 8A:
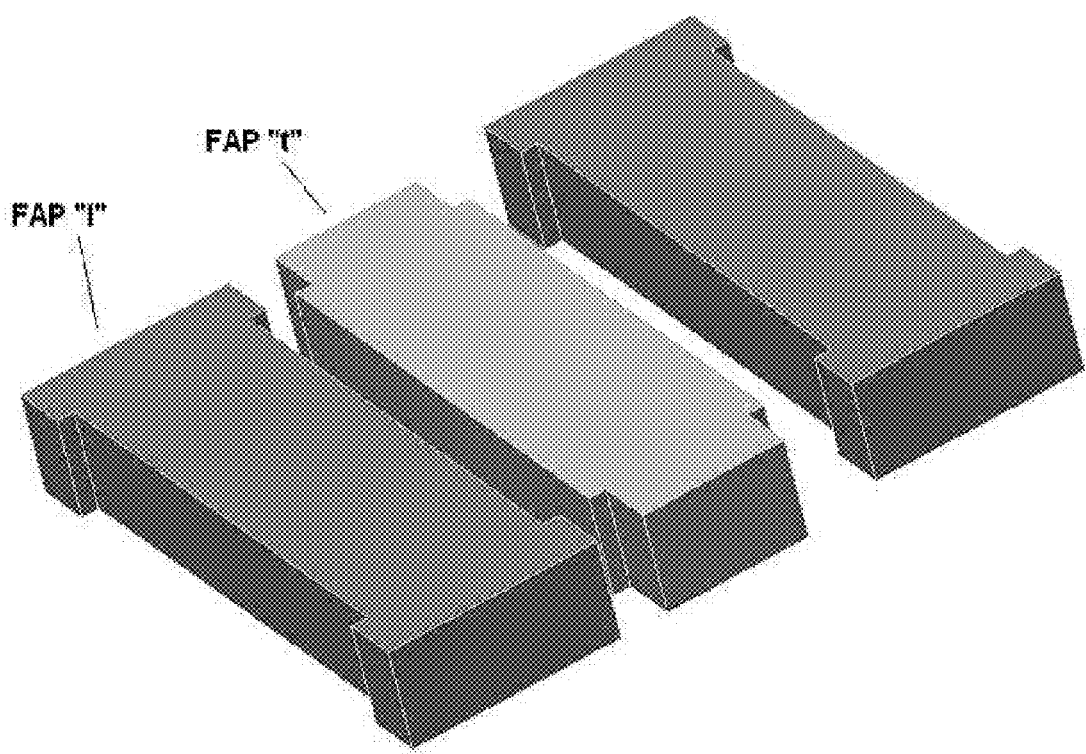
FIGS. 8A-8B illustrate certain features of some further embodiments of the present invention.
Figure 8B:
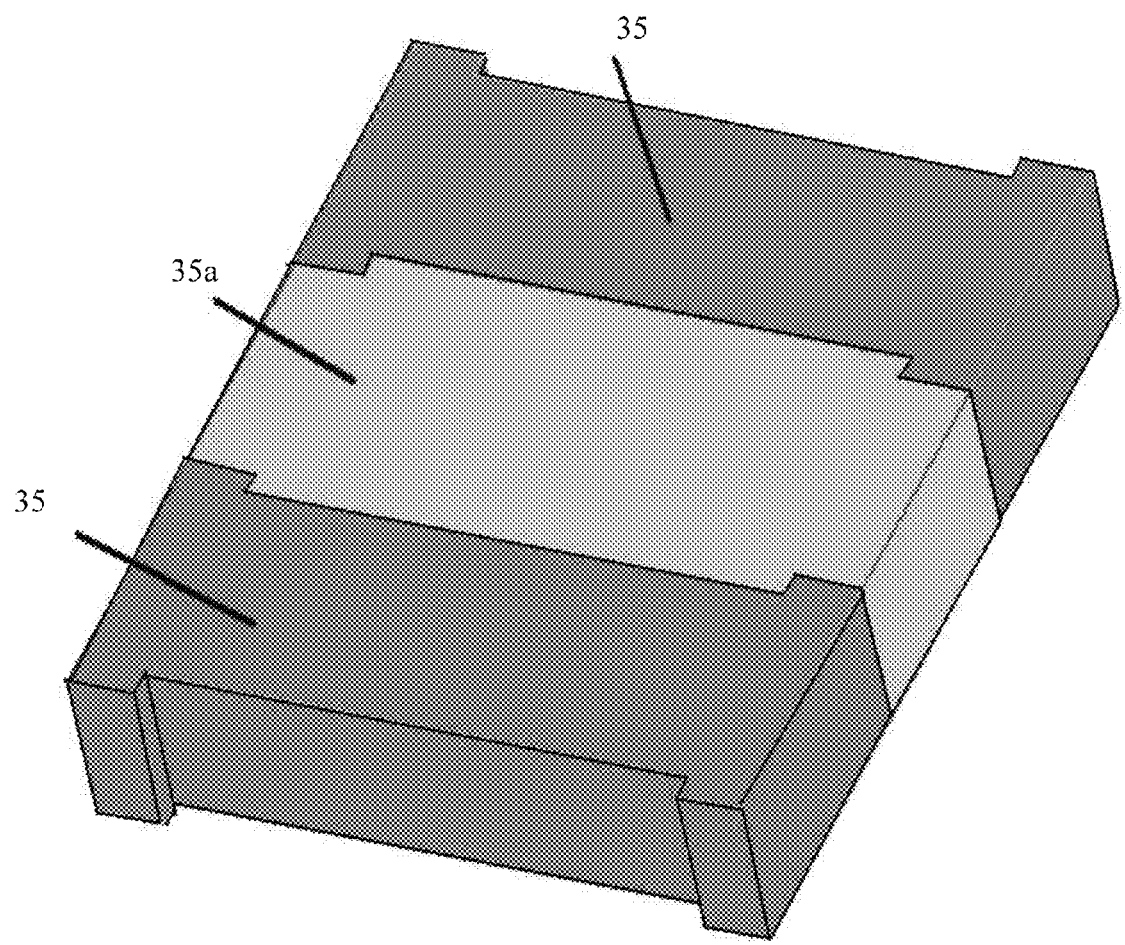

In some embodiments of the instant invention, FAPs pieces (e.g., FAP "I" and FAP "t" as shown in FIGS. 8A-B) can have any configuration which provides desirable adaptive passive filtering. In some embodiments of the instant invention, FAPs can have any suitable thickness which provides desirable adaptive passive filtering. In some embodiments, FAPs in the multi-part core can be united by various suitable interlocking shapes. In some embodiments, each FAP in a multi-part core can have different shape/configuration, thickness, and/or composition from at least one other FAP in the multi-part core. In some embodiments, FAPs can be made from one or more materials that would have, by itself and/or in combination, a desired Curie temperature.

Figure 9:
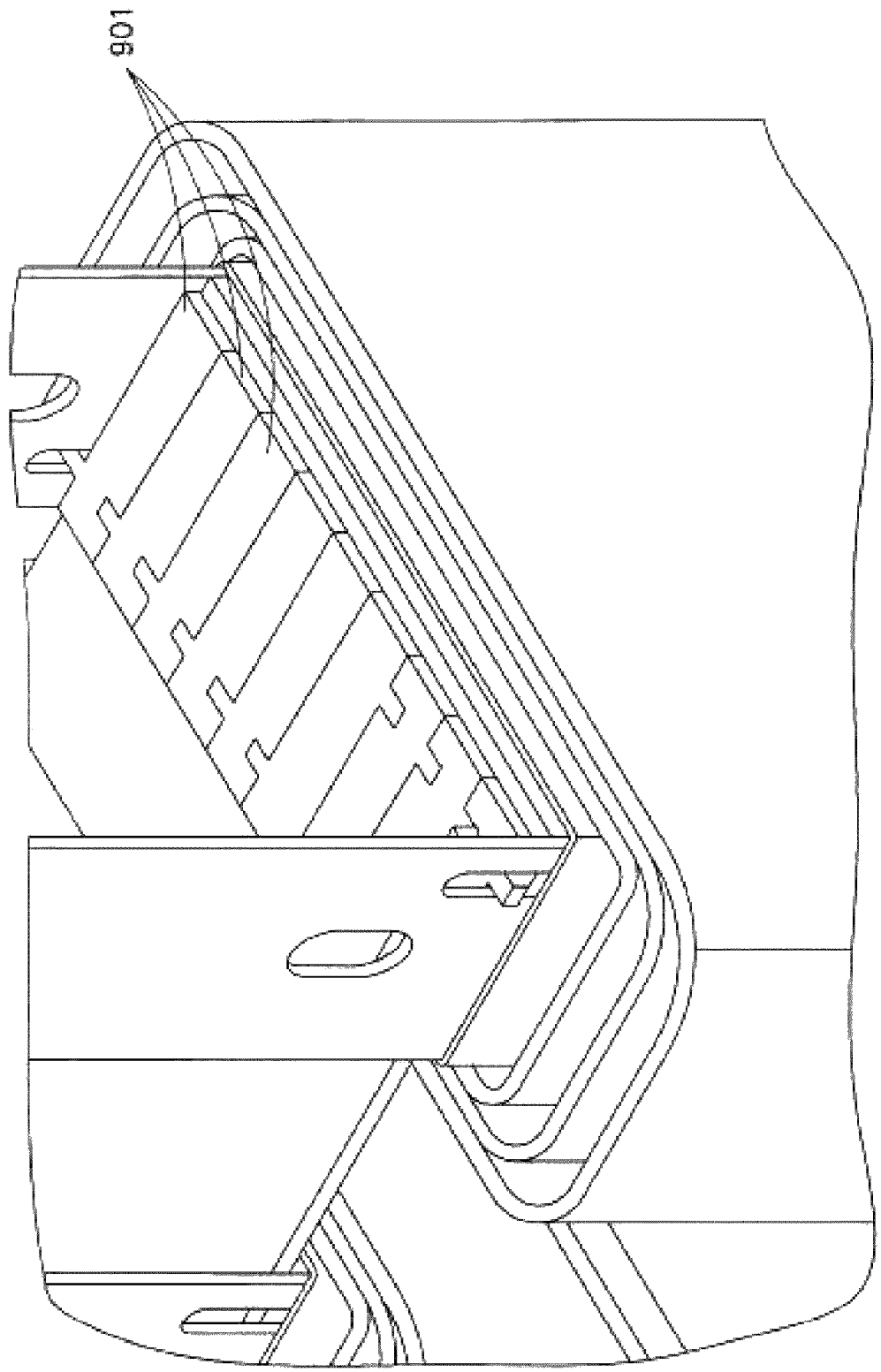
FIG. 9 illustrates certain features of some further embodiments of the present invention.
Figure 11A:
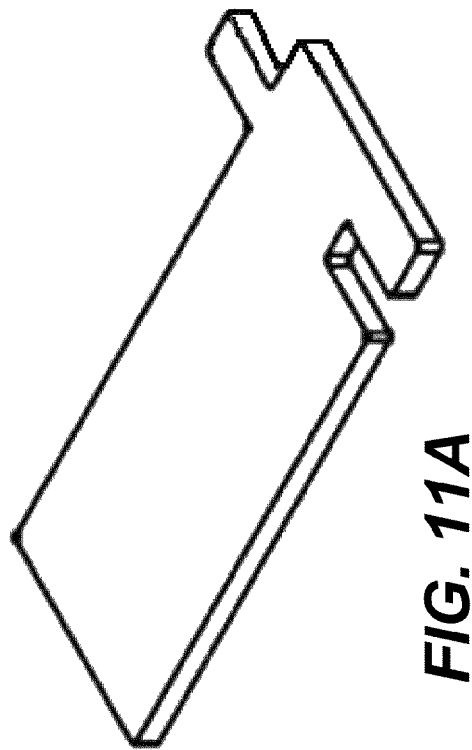
FIGS. 11A-11B illustrate certain features of some further embodiments of the present invention.
Figure 11B:
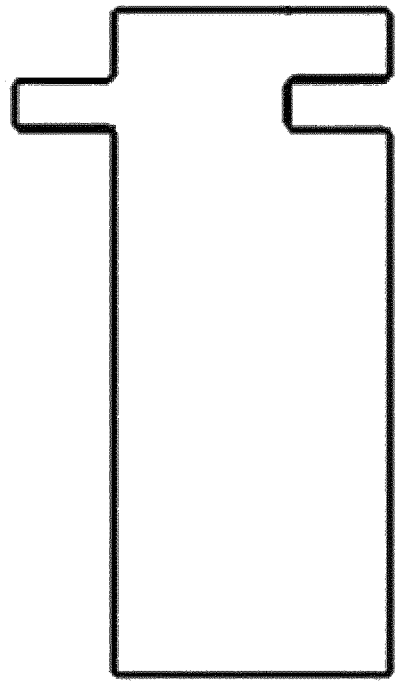
Figure 10A:
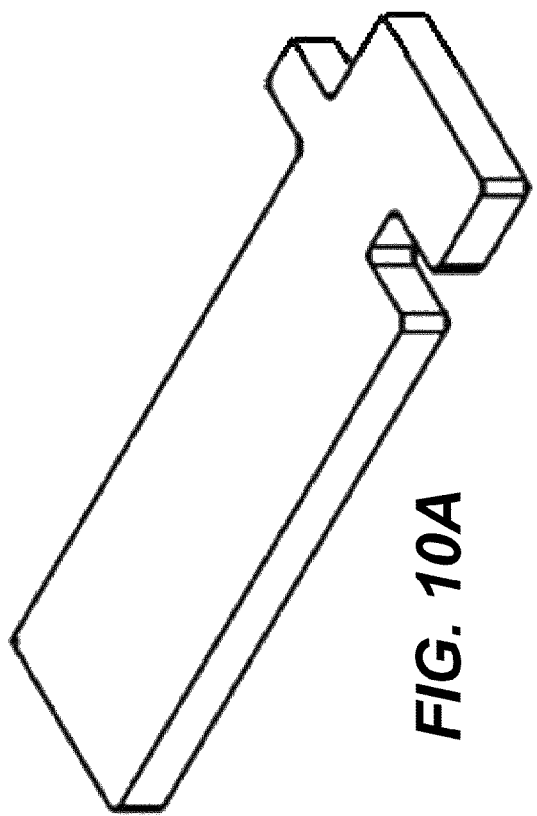
FIGS. 10A-10B illustrate certain features of some further embodiments of the present invention.
Figure 10B:
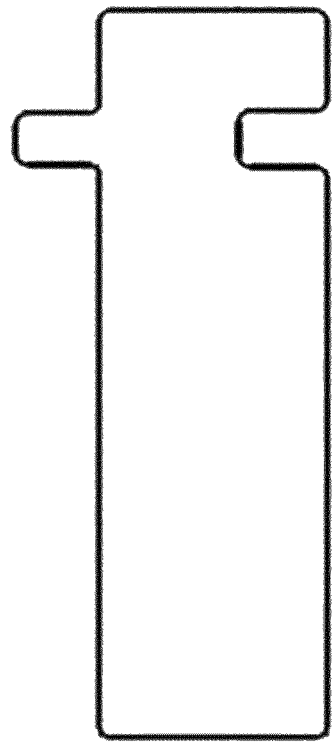

For some embodiments, FIGS. 2A-B, FIG. 3 and FIGS. 4A-B show the exemplary positions for FAPs within the devices of the instant invention, but not limiting to, —FAPs (35, 35a, 36, 36a, 37, and 37a). In some embodiments of the instant invention, FAPs can, for example, have shapes shown in FIG. 5. In some embodiments of the instant invention, the notches 38 can be used to lock together with the protrusions 39 as shown in FIG. 6. In some embodiments of the instant invention, FAPs, shown in FIG. 5 and FIG. 6, can be locked together in ways, for example, shown in FIG. 7 and FIGS. 8A-B. In some embodiments of the instant invention, the notches 38 can be used to position and/or secure FAPs within the devices of the instant invention with the aid of brackets 40-45 shown in FIGS. 4A-B. In some embodiments, as shown in FIG. 9, bracket(s) holding the core of the inductor can have structure(s) (e.g., a cutout) that is adapted to accept/interlock with shape(s) of FAPs material(s) (e.g., protrusions) to guide into and/or secure FAPs in their desired uniformed position within inductor(s) so that inductances are balanced.

Figure 5:
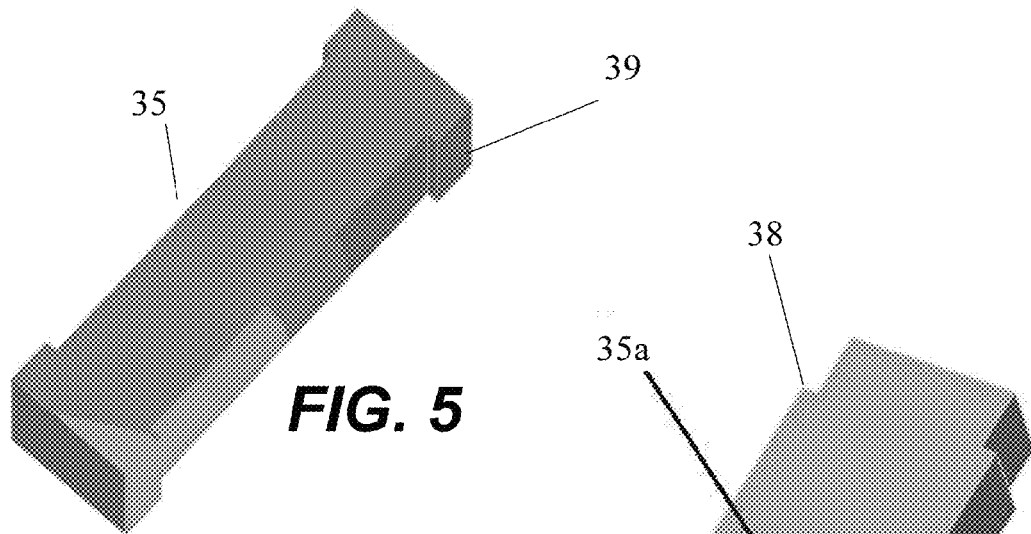
FIG. 5 illustrates certain features of some further embodiments of the present invention.
Figure 6:
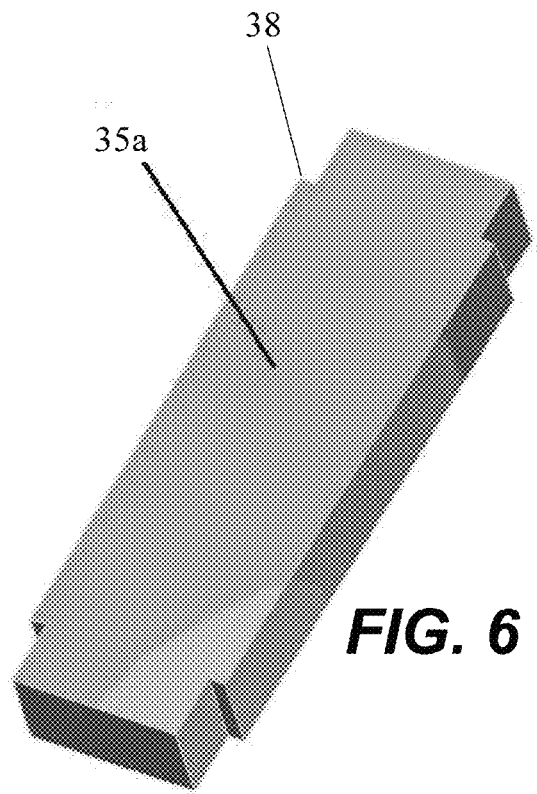
FIG. 6 illustrates certain features of some further embodiments of the present invention.
Figure 7:
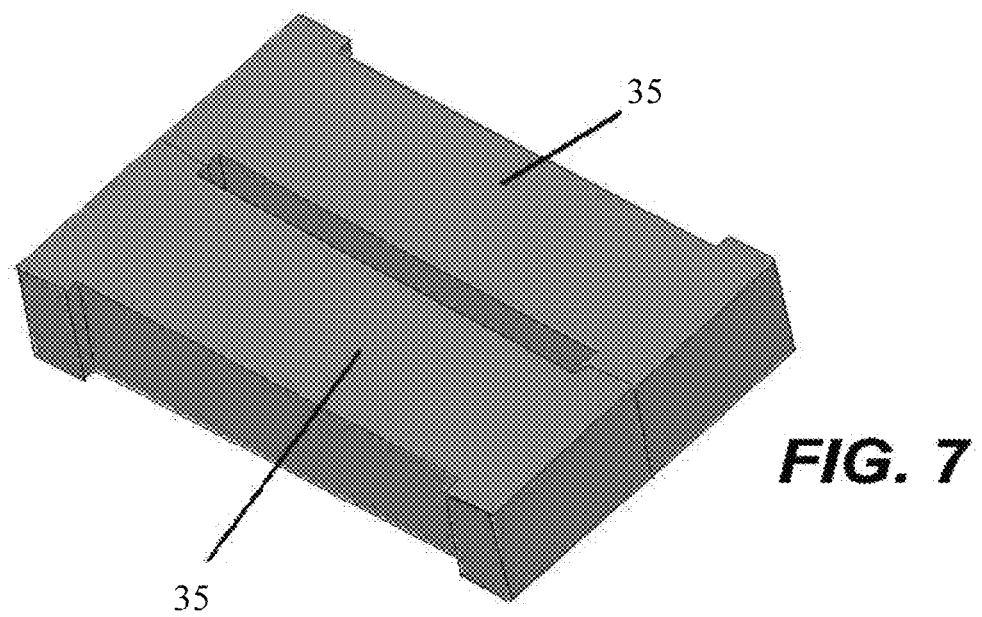
FIG. 7 illustrates yet certain features of some further embodiments of the present invention.

In some embodiments of the instant invention, as shown in FIGS. 5 and 6, FAPs, the interlocking high permeability core gap pieces, can interlock by way of a notch 38 and a protrusion 39. In some embodiments of the instant invention, as shown in FIGS. 8A-B, FAPs pieces can be further divided into FAP "I" and FAP "t" structures based at least in part on their shapes and/or size.

In some embodiments, as illustrated in FIGS. 9, 10A-B and 11A-B, FAPs (901) can have various designs (e.g., various forms/shapes). In some embodiments, FAPs (901) of the same form per a lamination size can be used in creating the FAP element, by stacking FAP pieces to the core depth. In some embodiments, the slots in the straps and the interlocking shapes of FAPs can assist to position FAPs (901) with respect to the core. In some embodiments, FAPs having shapes, shown in FIGS. 9, 10A-B and 11A-B, are referred herein as so-called FAP "C" pieces.

In some embodiments of the instant invention, FAPs can be stacked on top of each other or next to each other. In some embodiments, the stackable FAPs can be stacked at different depths depending on a particular desired rating of a device.

In some embodiments, the instant invention can also utilize an insulator having sufficiently high dielectric constant— e.g., one or more gap insulator piece, items 46-48 in FIGS. 2A-B and 4A-B. In some embodiments, the insulator piece(s) can have one or more suitable compositions containing materials such as, but not limited to, Nomex® (Dupont).

Figure 2A:
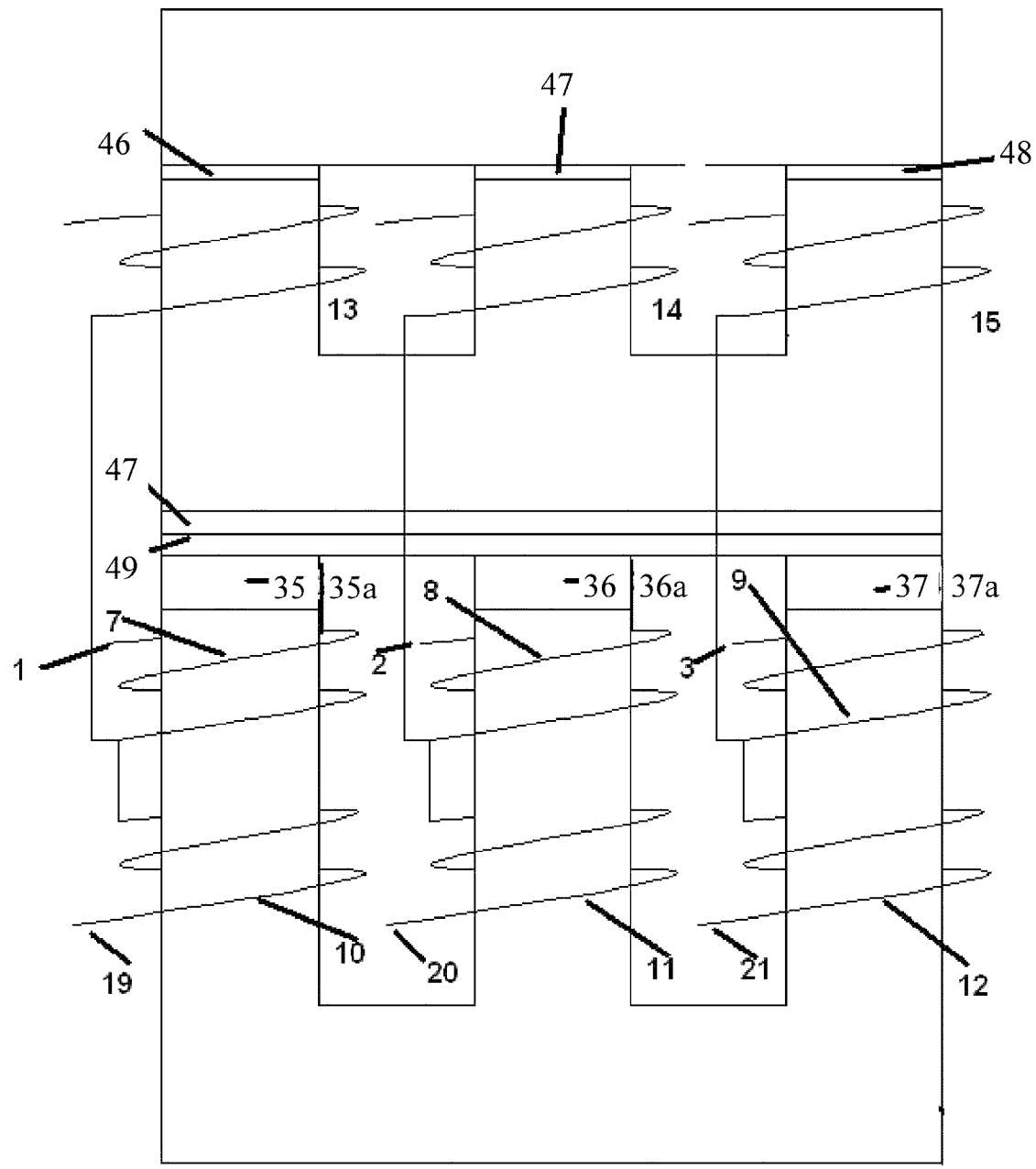
FIG. 2A illustrates certain features of some further embodiments of the present invention.
Figure 2B:
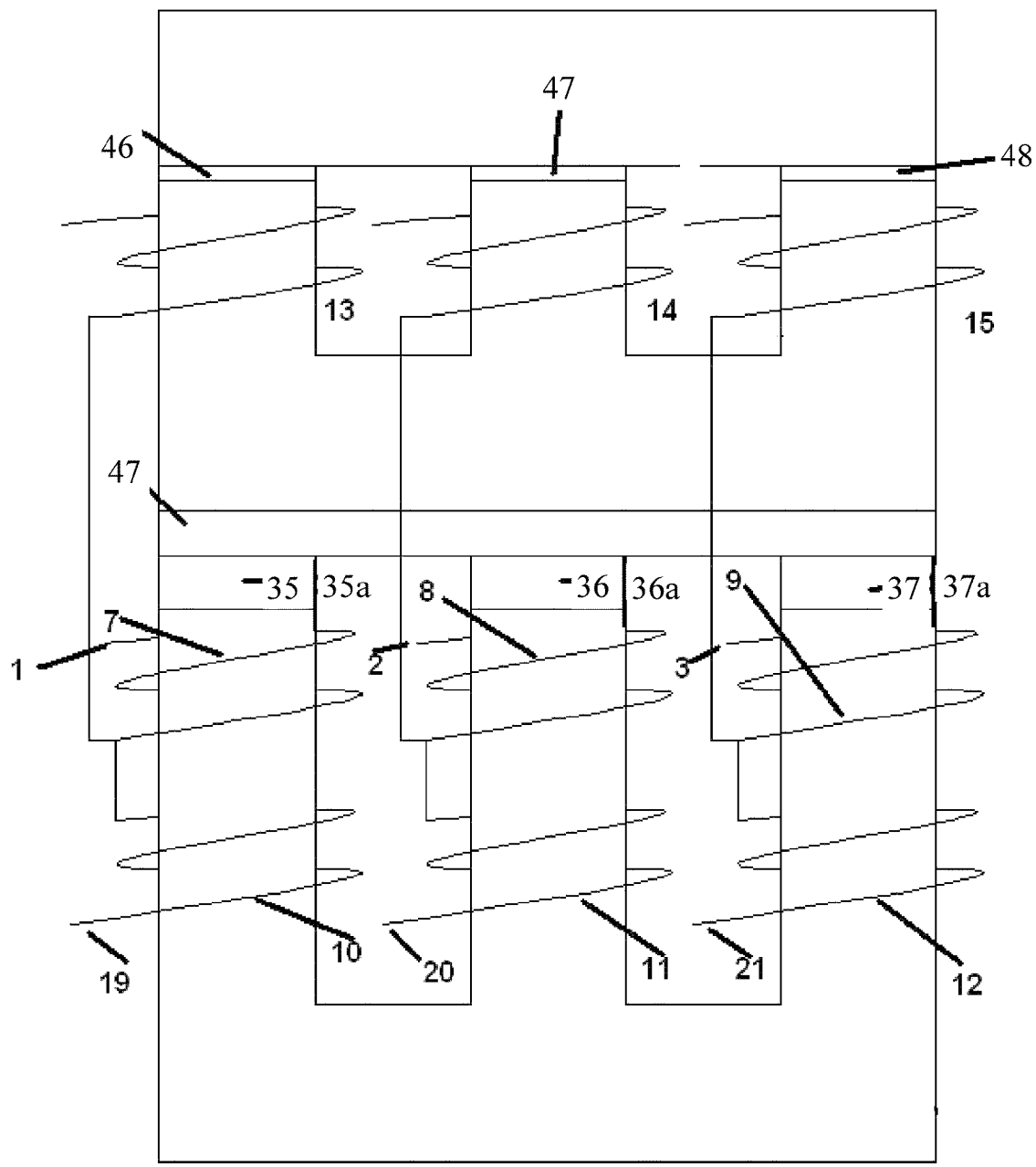
FIG. 2B illustrates certain features of some further embodiments of the present invention.
Figure 3:
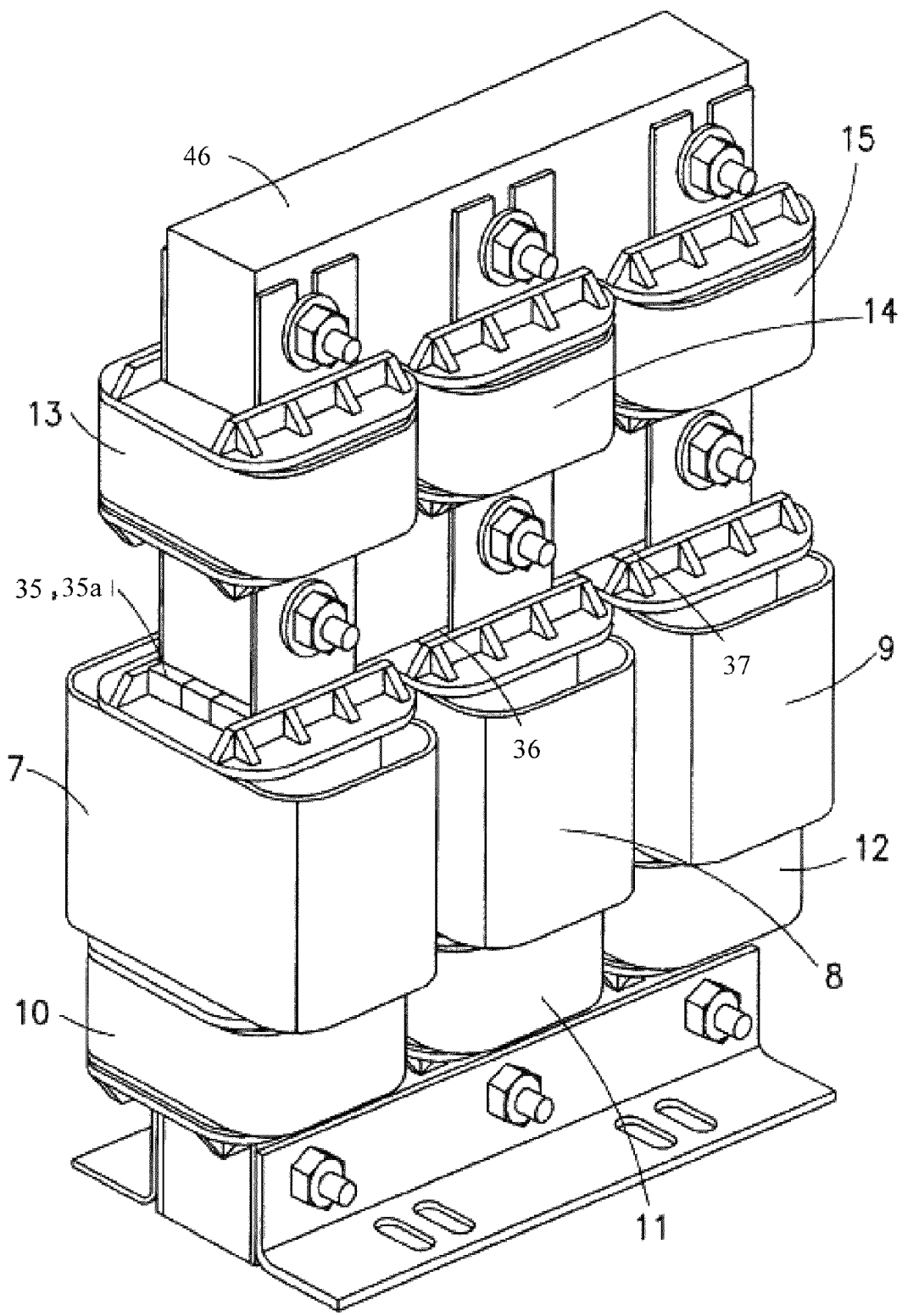
FIG. 3 illustrates certain features of some further embodiments of the present invention.
Figure 4A:
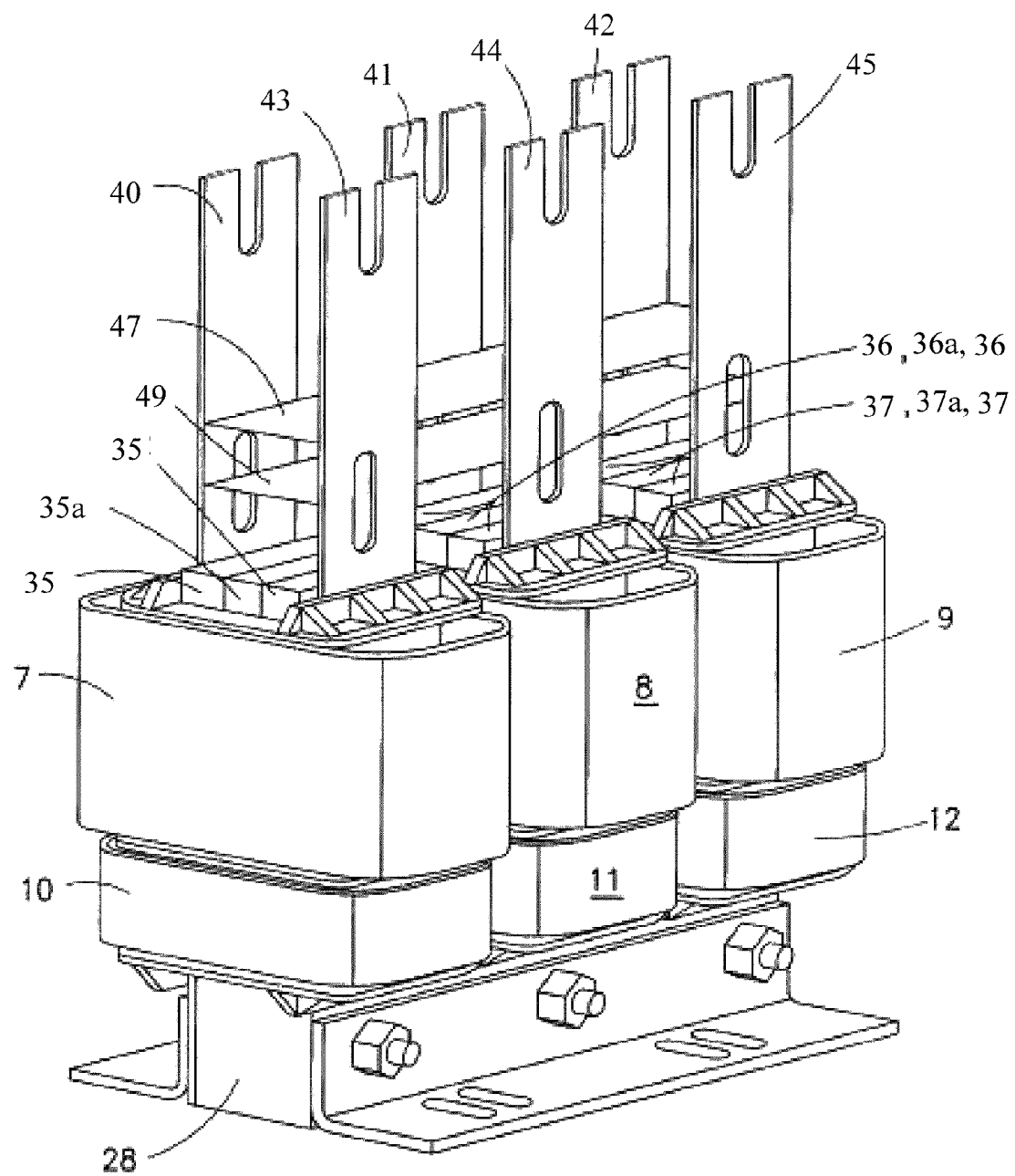
FIG. 4A illustrates certain features of some further embodiments of the present invention.
Figure 4B:
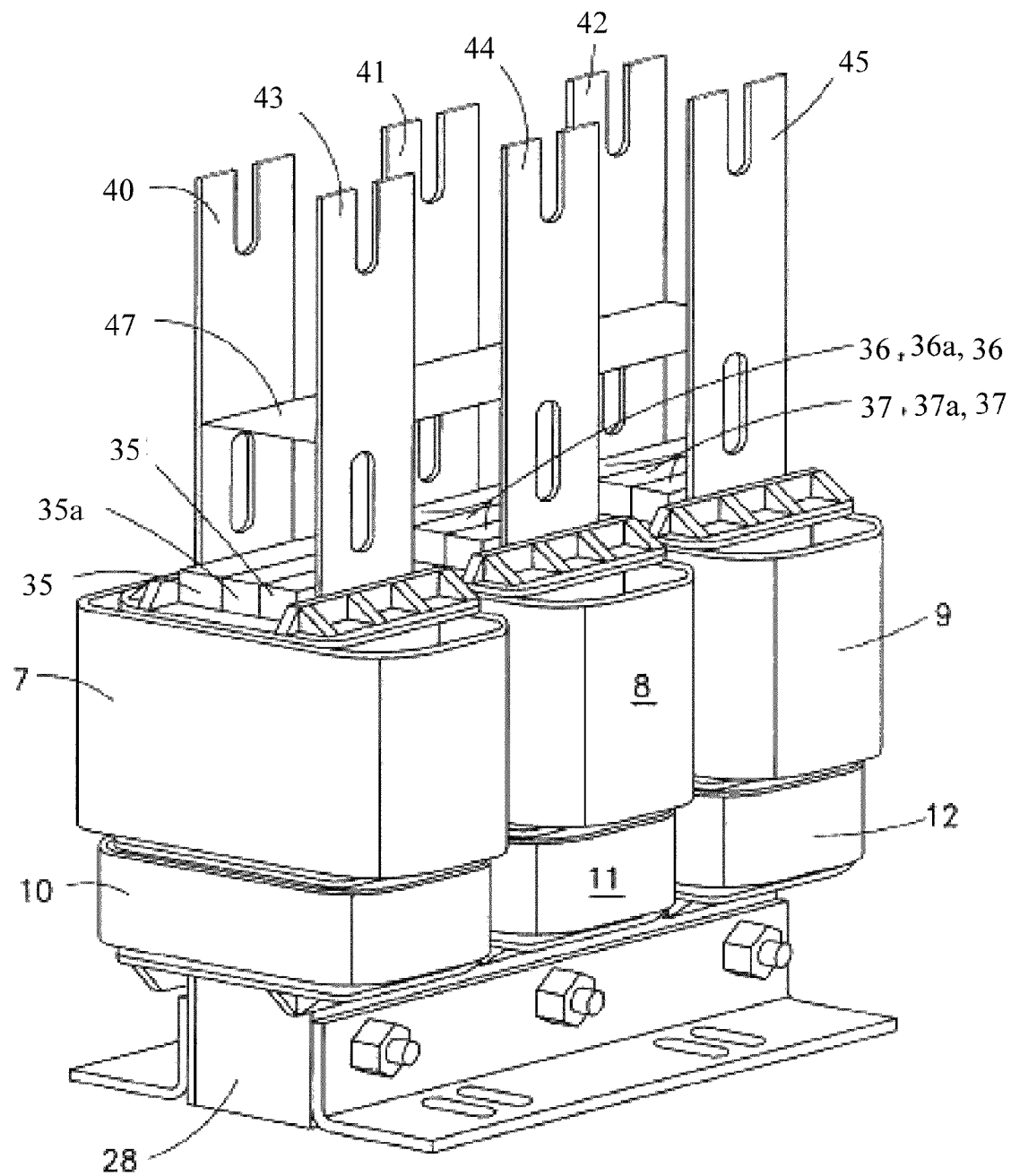
FIG. 4B illustrates certain features of some further embodiments of the present invention.

In some embodiments, the instant invention provide a metallic gap piece, shown, for example, as item 49 in FIGS. 2A and 4A, that creates so-called "MAP" piece(s). In some embodiments, MAPs can act as the magnetic flux controlled ferrite-based heating elements to heat the FAPs materials. FIGS. 1A-B schematically show some embodiments of the instant invention that include MAPs (items 50-55).

In some embodiments of the instant invention, a MAP piece is a magnetic flux controlled FAP-heating element. In some embodiments of the instant invention, at full load currents, the magnetic flux density in the core can be higher. In some embodiments of the instant invention, the magnetic flux in the core is perpendicular to the MAP, therefore it produces eddy currents in the MAP structure. In some embodiments of the instant invention, the produced eddy currents generate heat. In some embodiments of the instant invention, the MAP piece can then heat FAPs up to the Curie temperature near full load operation. In some embodiments of the instant invention, when FAPs reach the Curie temperature, FAPs become non-magnetic as, for example, shown by diagrams of FIGS. 12 and 13D, with some materials which can be utilized in FAPs of those embodiments of the instant invention. In some embodiments of the instant invention, when FAPs become non-magnetic, the inductance characteristics become linear throughout the operating range. In some embodiments of the instant invention, the harmonic distortion at full load current can be returned to optimal range.

In some embodiments of the instant invention, the thickness and size of MAP pieces can be adjusted to control the amount of heat MAPs generate. In some embodiments of the instant invention, a thicker and/or more conductive MAP will typically heat FAPs more and/or faster than a thin and/or less conductive MAP. In some embodiments of the instant invention, MAPs can be typically made from, but not limited to, copper, aluminum, or any other suitable material that behaves in accordance with principles of the instant invention regarding the operational relationship(s) of MAPs and FAPs.

In some embodiments of the instant invention, composition, shape/configuration, conductivity characteristics, and thickness of MAP piece(s) can vary to achieve desirable temperature to which and/or speed with which FAPs can be heated.

Figure 15:
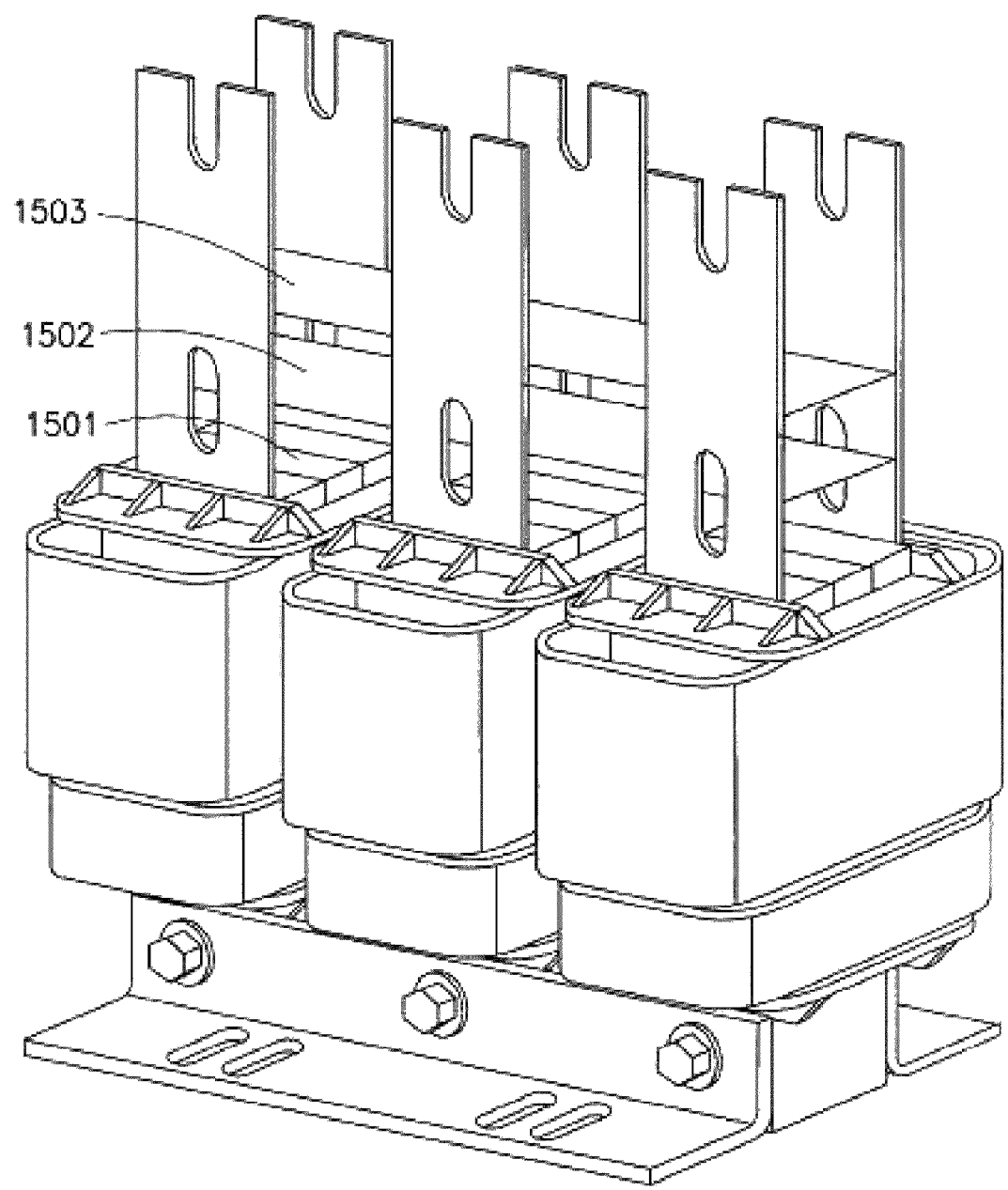
FIG. 15 illustrates certain features of some further embodiments of the present invention.

In some embodiments of the instant invention, as shown in FIG. 15, an adaptive passive filter can be constructed to incorporate FAPs pieces 1501, a copper MAP piece 1502, and a Nomex insulation gap piece 1503. In some embodiments, the copper MAP piece 1502 can be used to elevate the gap temperature above about 140 degrees Celsius to trip the Curie temperature to "turn off" the inductance variation at full load. In some applications, for example with an 11 A (Ampere) test filter, a 0.008 inch thick copper foil can be used for the copper MAP piece 1502. In some embodiments, composition, shape/configuration, and thickness of the insulation piece(s) 1503 can vary to achieve desirable insulation characteristics.

Figure 16:
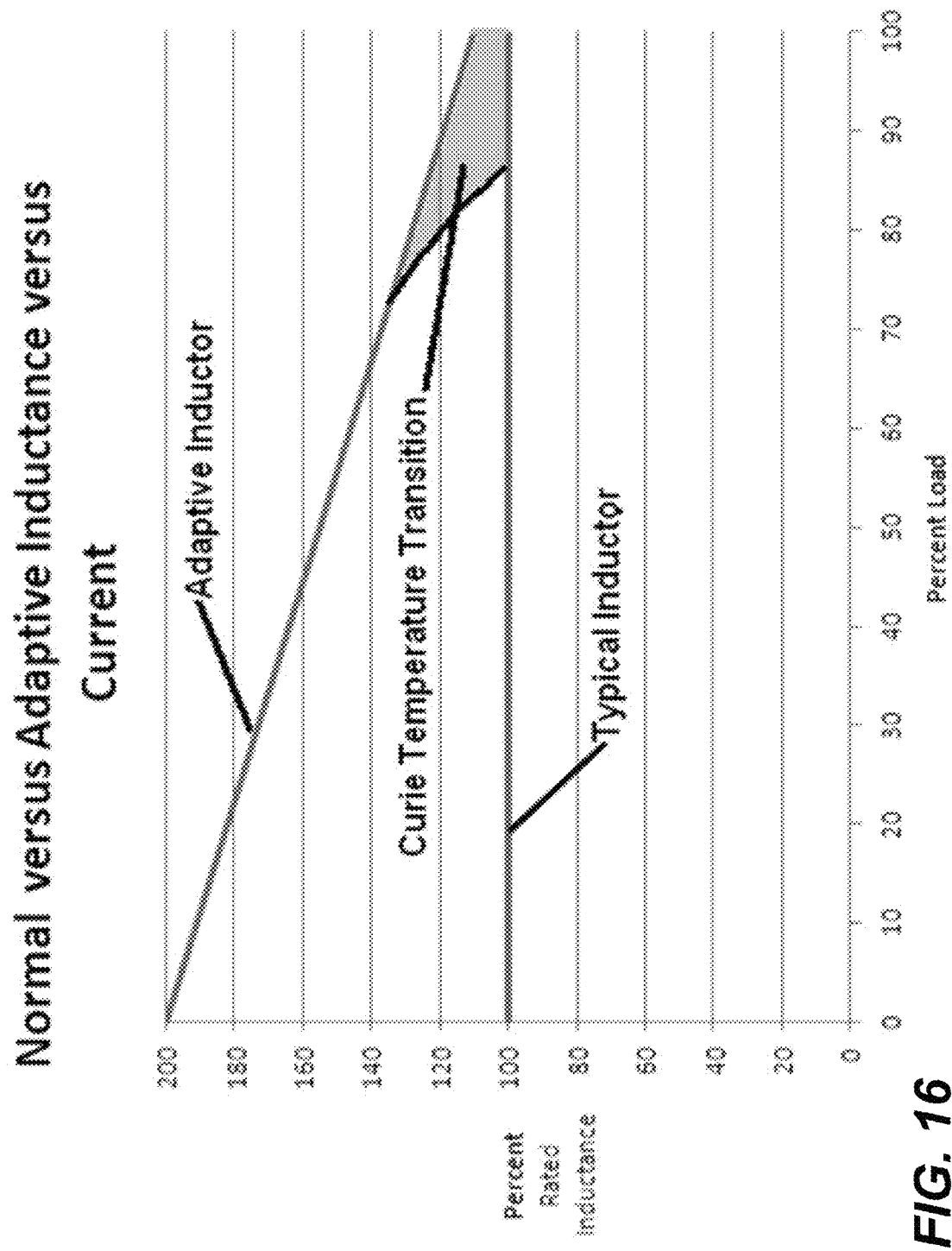
FIG. 16 illustrates certain features of some further embodiments of the present invention.

FIG. 16 illustrates differences in operational characteristics between some embodiments of the instant invention and a typical inductor. In some embodiments, the instant invention can allow an inductor to have nearly the same percent impedance throughout most of the operating range. In some embodiments of the instant invention, one inductor could be used in a multi-drive application instead of one sized for each drive. Some embodiments, the instant invention can allow inductors produced in accordance with the instant invention to have higher inductances at light loads.

Some Exemplary Applications of Some Embodiments of the Instant Invention

Adaptive Passive Three Phase Filter

In some embodiments, passive harmonic filters connect in series at the input to any six pulse drive. In some embodiments, being low pass filters, the passive harmonic filters attenuates each harmonic frequency, resulting in the lower harmonic distortion levels. In some embodiments, the passive harmonic filters allow for operating conditions such as unbalanced line voltages and from no load to full load. In some embodiments, the passive harmonic filters can result in provide losses that are less than one percent of the load power rating. In some embodiments, the passive harmonic filters do not cause power system resonance problems and do not attract harmonics from other non-linear loads sharing the same power source. In some embodiments, the passive harmonic filters can be utilized for variable frequency, variable torque applications.

Figure 19:
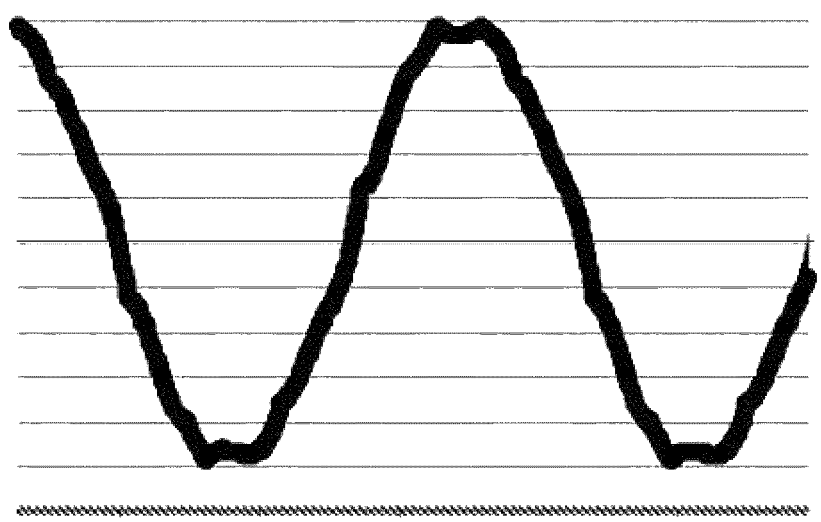
FIG. 19 illustrates certain features of some further embodiments of the present invention.
Figure 20:
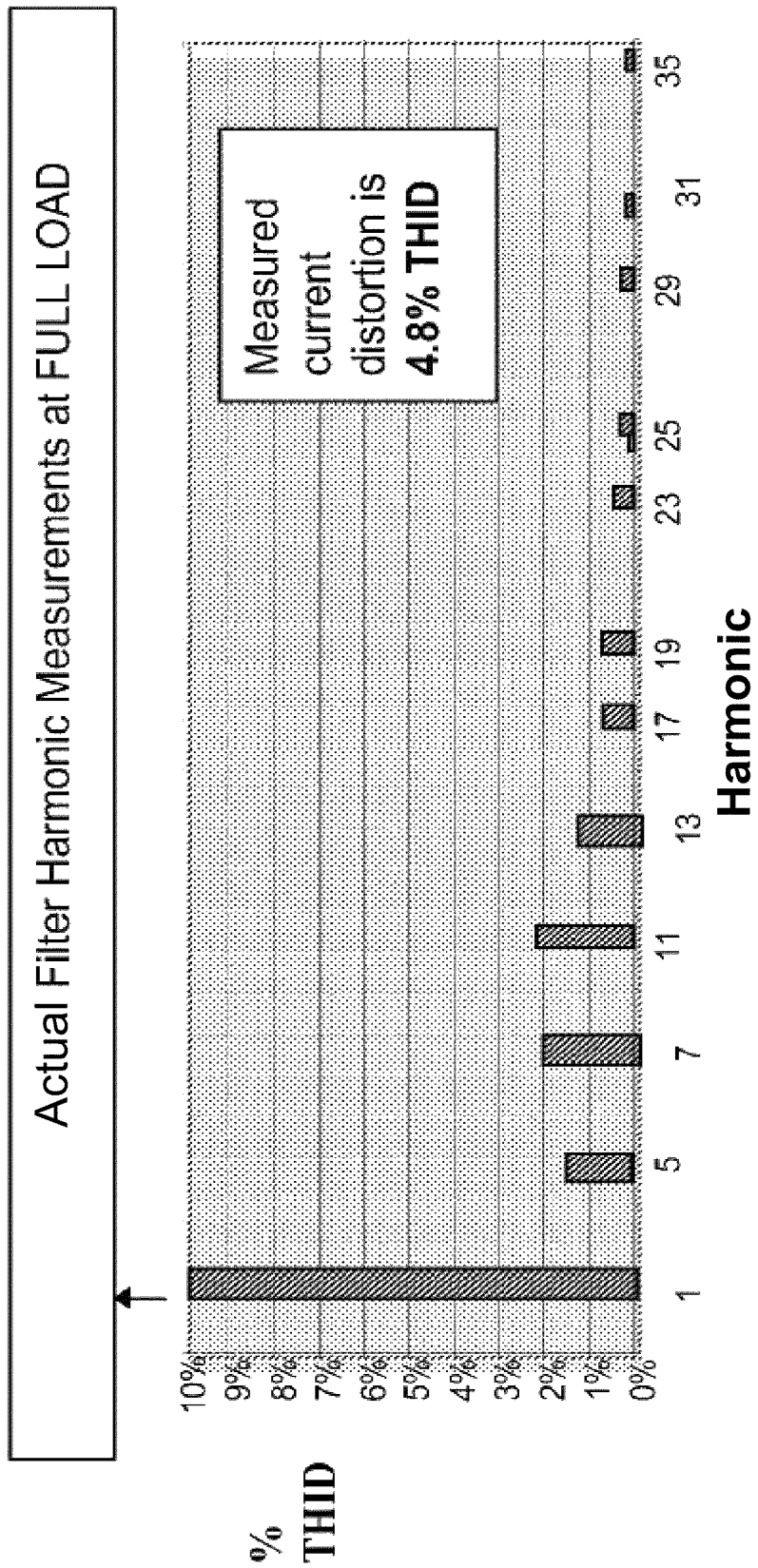
FIG. 20 illustrates certain features of some further embodiments of the present invention.

In some embodiments, the passive harmonic filters of the instant invention can convert any six pulse drive to harmonic mitigation performance that is better than 18-pulse rectification. In some embodiments, the passive harmonic filters of the instant invention exhibit the input current waveform and harmonic spectrum that are demonstrated in FIGS. 19-20.

In some embodiments, due to their internal series reactance, component tolerances and circuit configuration, the passive harmonic filters of the instant invention are only mildly affected by unbalanced line voltage conditions and their performance is quite consistent from no load to full load conditions as demonstrated in FIG. 21. In some embodiments, a combination of six pulse VFD and the passive harmonic filters of the instant invention attenuated harmonics better than an eighteen pulse drive, when tested with various percentages of line voltage unbalance, and when operating at load conditions ranging from 0% to 100% load. In some embodiments, the combination of six pulse VFD and the passive harmonic filters of the instant invention also reduced harmonics to lower levels than the enhanced 18-pulse drive, which used additional line reactors.

Figure 17:
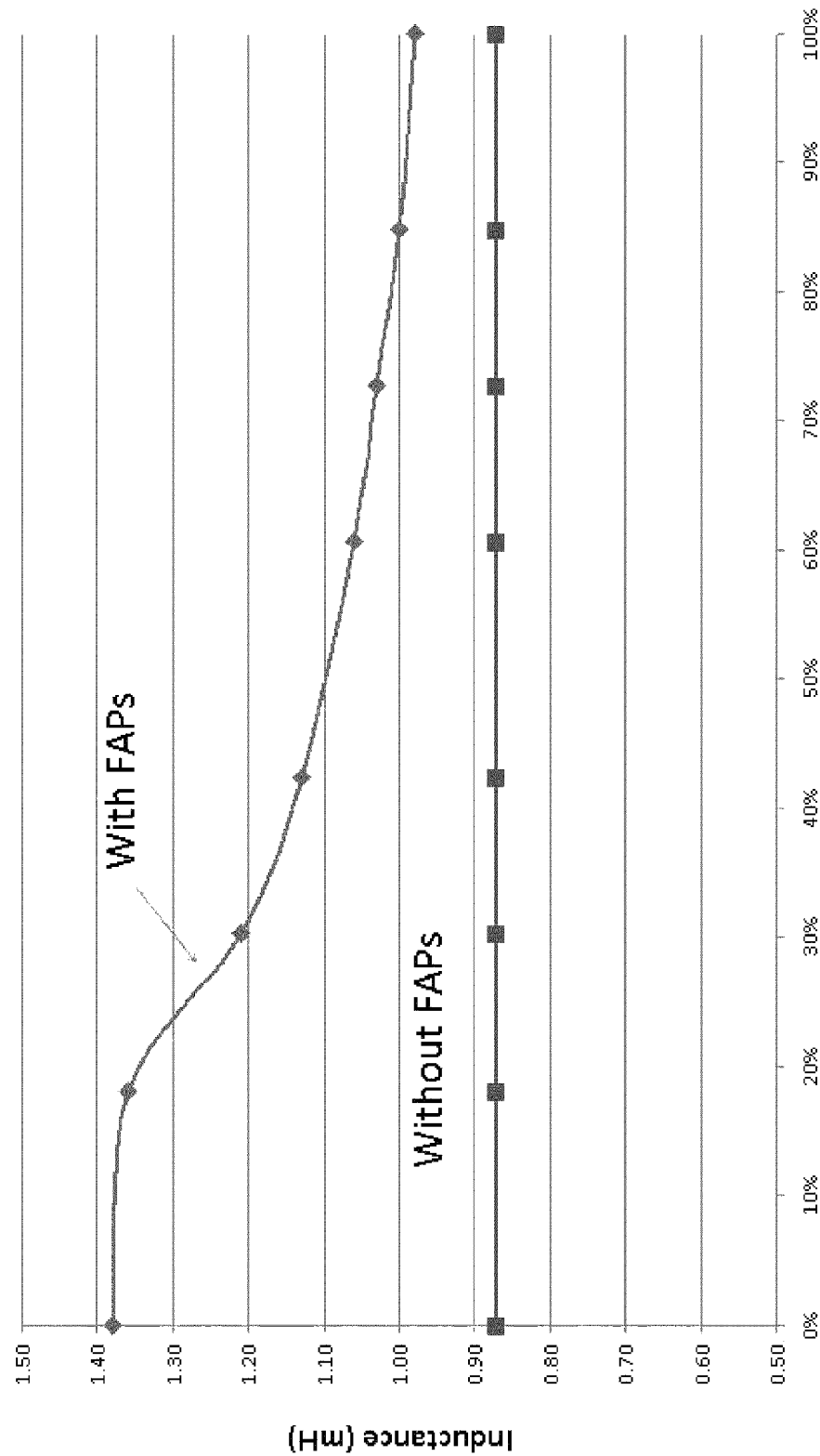
FIG. 17 illustrates certain features of some further embodiments of the present invention.

In some embodiments, the instant invention provides for a passive three phase filter that includes FAPs made from Fair-Rite #77 material (FIGS. 13A-13I) which has a Curie temperature of about 200 degree Celsius. In some embodiments, the instant invention can allow to have the total line inductance of the passive three phase filter, such as, but not limiting to, passive three phase drive input filter, to be elevated by about 50% at reduced loads. FIG. 17 shows a typical line inductance curve for a 165 ampere (A) three phase drive input filter without FAPs and a new line inductance curve for a modified 165 A three phase drive input filter with FAPs designed in accordance with at least some principles of the instant invention.

Figure 18:
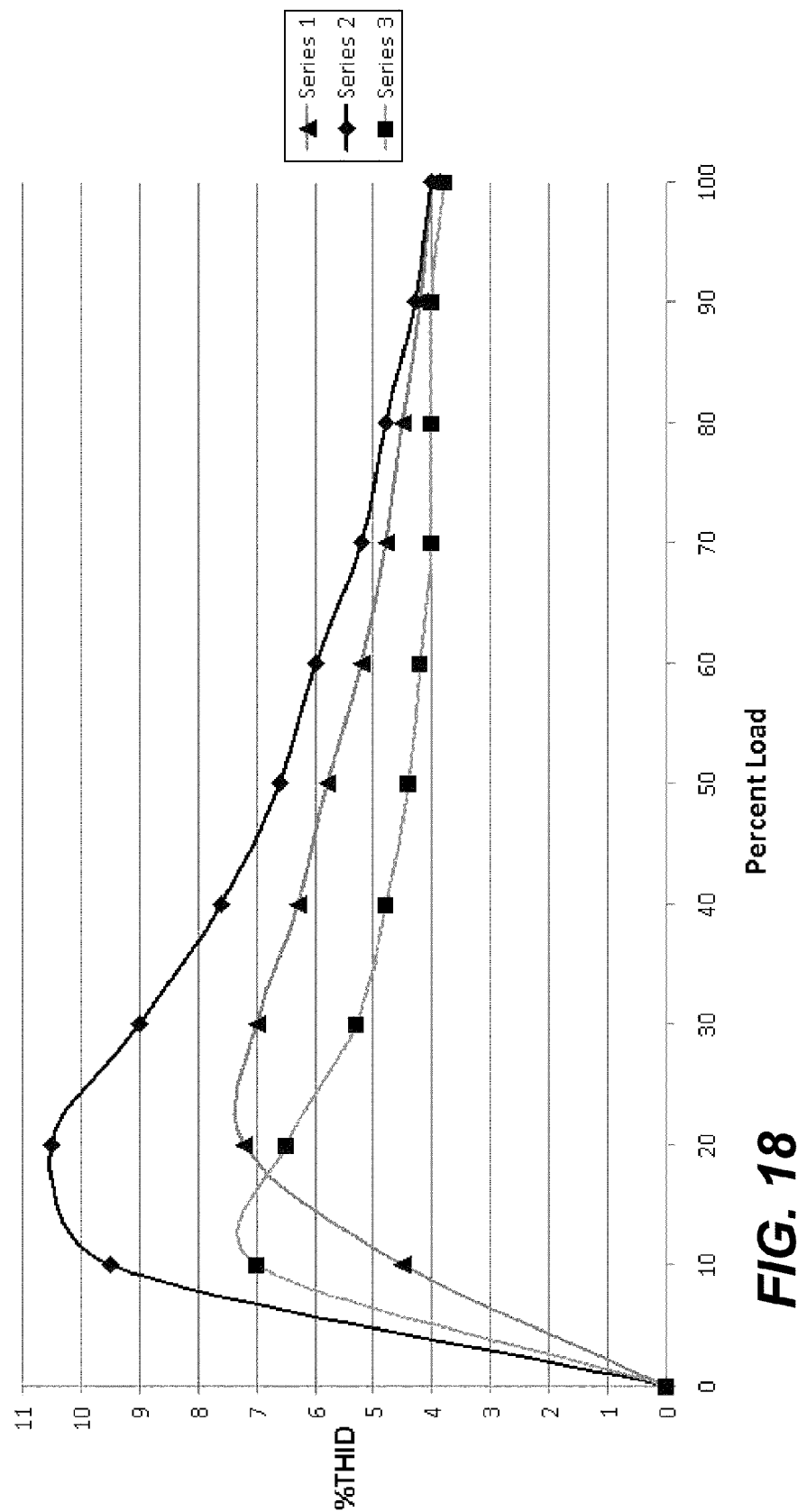
FIG. 18 illustrates certain features of some further embodiments of the present invention.

For example, FIG. 18 also shows a graph which compares percent THID for passive three phase drive input filters without FAPs (series 1 and 2) with a filter that includes FAPs and designed in accordance with at least some principles of the instant invention (series 3).

In some embodiments, the instant invention can provide a harmonic mitigating device that can include at least the following components: a) at least one active filter; b) at least one passive filter; c) at least one control switch, wherein the at least one control switch operationally controls whether the at least one active filter or the at least one passive filter can be utilized by the harmonic mitigation device to mitigate at least one harmonic current flow.

In some embodiments, the at least one control switch operationally switches the harmonic mitigation device from utilizing the at least one active filter to utilizing the at least one passive filter when a current load exceeds a predetermined percent of a full current load. In some embodiments, the predetermined percent is at least 20 percent. In some embodiments, the at least one passive filter is i) a passive single phase filter or ii) a passive three phase filter.

In some embodiments, the at least one passive filter can include at least the following components: at least one FAP positioned along at least one magnetic flux path; wherein the at least one FAP is a high permeability core gap piece; and wherein the at least one FAP has an effective magnetic permeability that varies based on at least in part on one of the following factors:

i) at least one magnetic flux through the at least one FAP, and
 ii) sufficient heating of the at least one FAP.

In some embodiments, the sufficient heating is to Curie temperature of the at least one FAP. In some embodiments, the at least one passive filter further comprises at least one MAP, wherein the at least one MAP is a metallic gap piece, wherein the at least one MAP is located in sufficient proximity to the at least one FAP hereby resulting in the sufficient heating by at least one MAP of the at least one FAP. In some embodiments, the at least one passive filter further comprises at least one insulator, wherein the at least one insulator is positioned along the at least one magnetic flux part hereby further adjusting an inductance of the inductor. In some embodiments, the at least one FAP comprises at least one ferrite material. In some embodiments, the at least one soft ferrite material is selected from a group consisted of Nickel-Zinc ferrite material, Magnesium-Zinc ferrite material, and Manganese-Zinc ferrite material.

In some embodiments, the at least one FAP can include at least one molyperalloy power material. In some embodiments, the at least one molyperalloy power material contains at least 50 percent weight of Nickel, at least 20 percent weight of Iron, and the balance comprising another suitable material. In some embodiments, the Curie temperature is between about 130 and about 1200 degrees Celsius.

In some embodiments, the at least one FAP comprises at least one first FAP part and at least one second FAP part wherein the at least one first FAP part and the at least one second FAP part are separate structures. In some embodiments, the at least one first FAP part differs from the at least one second FAP part in at least one of the followings characteristics: composition, size, and shape.

While a number of embodiments of the present invention have been described, it is understood that these embodiments are illustrative only, and not restrictive, and that many modifications may become apparent to those of ordinary skill in the art.

What is claimed is:

1. A harmonic mitigating device, comprising:
 at least one active filter;
 at least one passive filter;
 at least one control switch, wherein the at least one control switch operationally controls whether the at least one active filter or the at least one passive filter is utilized by the harmonic mitigation device to mitigate at least one harmonic current flow;
 at least one high permeability core gap piece (FAP), positioned along at least one magnetic flux path; and
  wherein the at least one FAP has an effective magnetic permeability that varies based on at least in part on one of the following factors:
   i) at least one magnetic flux through the at least one FAP, and
   ii) sufficient heating of the at least one FAP.

2. The harmonic mitigating device of claim 1, wherein the at least one control switch operationally switches the harmonic mitigation device from utilizing the at least one active filter to utilizing the at least one passive filter when a current load exceeds a predetermined percent of a full current load.

3. The harmonic mitigating device of claim 2, wherein the predetermined percent is at least 20 percent.

4. The harmonic mitigating device of claim 1, wherein the sufficient heating is to Curie temperature of the at least one FAP.

5. The harmonic mitigating device of claim 4, wherein the at least one passive filter further comprises at least one metallic gap piece (MAP), wherein the at least one MAP is located in sufficient proximity to the at least one FAP hereby resulting in the sufficient heating by at least one MAP of the at least one FAP.

6. The harmonic mitigating device of claim 5, wherein the at least one passive filter further comprises at least one insulator, wherein the at least one insulator is positioned along the at least one magnetic flux part hereby further adjusting an inductance of the inductor.

7. The harmonic mitigating device of claim 4, wherein the Curie temperature is between about 130 and about 1200 degrees Celsius.

8. The harmonic mitigating device of claim 1, wherein the at least one FAP comprises at least one ferrite material.

9. The harmonic mitigating device of claim 8, wherein the at least one soft ferrite material is selected from a group consisted of Nickel-Zinc ferrite material, Magnesium-Zinc ferrite material, and Manganese-Zinc ferrite material.

10. The harmonic mitigating device of claim 9, wherein the Curie temperature is about 200 degrees Celsius.

11. The harmonic mitigating device of claim 1, wherein the at least one FAP comprises at least one material having suitable relative permeability in a range between 14 to 550.

12. The harmonic mitigating device of claim 1, wherein the at least one FAP comprises at least one molyperalloy power material.

13. The harmonic mitigating device of claim 12, wherein the at least one molyperalloy power material contains at least 50 percent weight of Nickel, at least 20 percent weight of Iron, and the balance comprising another suitable material.

14. The harmonic mitigating device of claim 1, wherein the at least one FAP comprises at least one first FAP part and at least one second FAP part wherein the at least one first FAP part and the at least one second FAP part are separate structures.

15. The harmonic mitigating device of claim 14, wherein the at least one first FAP part differs from the at least one second FAP part in at least one of the followings characteristics: composition, size, and shape.

16. The harmonic mitigating device of claim 15, wherein the at least one first FAP part has a first shape and the at least one second FAP part has a second shape, and wherein the first shape is complementary to the second shape such that the at least one first FAP part interlocks with the at least one second FAP part to assemble the at least one FAP.

\* \* \* \* \*